United States Patent
Shree et al.

(10) Patent No.: US 12,094,144 B1
(45) Date of Patent: Sep. 17, 2024

(54) REAL-TIME CONFIDENCE-BASED IMAGE HOLE-FILLING FOR DEPTH MAPS

(71) Applicant: NODAR Inc., Somerville, MA (US)

(72) Inventors: Vikram Shree, Cambridge, MA (US); Piotr Swierczynski, Providence, RI (US); Leaf Alden Jiang, Concord, MA (US)

(73) Assignee: NODAR Inc., Somerville, MA (US)

( * ) Notice: Subject to any disclaimer, the term of this patent is extended or adjusted under 35 U.S.C. 154(b) by 0 days.

(21) Appl. No.: 18/340,806

(22) Filed: Jun. 23, 2023

(51) Int. Cl.
*G06T 7/593* (2017.01)
*G06T 5/20* (2006.01)
*G06T 5/77* (2024.01)

(52) U.S. Cl.
CPC ............... *G06T 7/593* (2017.01); *G06T 5/20* (2013.01); *G06T 5/77* (2024.01); *G06T 2207/10012* (2013.01); *G06T 2207/10028* (2013.01); *G06T 2207/30252* (2013.01)

(58) Field of Classification Search
CPC ..... G06T 7/50–596; G06T 2207/10012; G06T 2207/10021; G06T 2207/10028; G06T 5/005; G06T 5/20; G06T 2207/30252–30264; G06T 5/77; H04N 13/271; H04N 13/239
See application file for complete search history.

(56) References Cited

U.S. PATENT DOCUMENTS

| 8,208,716 B2 | 6/2012 | Choi et al. |
| 10,212,408 B1 | 2/2019 | Pappas-Katsiafas et al. |
| 11,282,234 B2 | 3/2022 | Jiang et al. |
| 2013/0100125 A1* | 4/2013 | Zhang ............... G06T 5/005 345/419 |
| 2014/0309838 A1 | 10/2014 | Ricci |

(Continued)

FOREIGN PATENT DOCUMENTS

WO WO 2023/059365 A1 4/2023

OTHER PUBLICATIONS

Gonzalez, Rafael C. and Richard E. Woods, "Digital Image Processing." Pearson, 3rd ed., 2008, pp. 144-154. (Year: 2008).*

(Continued)

*Primary Examiner* — Geoffrey E Summers
(74) *Attorney, Agent, or Firm* — Wolf, Greenfield & Sacks, P.C.

(57) ABSTRACT

A system and a method are provided for repairing a depth map. The repairing includes representing pixels of the depth map using a matrix H having values corresponding to depths, the pixels including hole pixels and non-hole pixels; determining a confidence mask matrix C for the depth map; for each hole pixel, determining a kernel G of neighboring pixels, the neighboring pixels having values corresponding to a predetermined distribution, and convolving the kernel G with corresponding portions of the matrix C and the matrix H to obtain an estimated depth; generating a corrected matrix $\hat{H}$ in which values for non-hole pixels are retained and in which the hole pixels have values corresponding to their estimated depths. The estimated depths may be normalized based on the matrix C. An updated depth map based on the corrected matrix $\hat{H}$ may be outputted to a control system of a vehicle.

21 Claims, 13 Drawing Sheets

(4 of 13 Drawing Sheet(s) Filed in Color)

(56) References Cited

U.S. PATENT DOCUMENTS

| | | | |
|---|---|---|---|
| 2016/0065930 A1* | 3/2016 | Chandra | G06T 7/223 |
| | | | 348/46 |
| 2017/0188002 A1 | 6/2017 | Chan et al. | |
| 2018/0154854 A1 | 6/2018 | Thieberger et al. | |
| 2018/0309974 A1 | 10/2018 | Varekamp et al. | |
| 2022/0111839 A1* | 4/2022 | Jiang | G06T 7/593 |

OTHER PUBLICATIONS

Weinhaus, Fred, "Digital Image Filtering." ImageMagick, Jul. 4, 2020. <https://web.archive.org/web/20200701000000*/http://www.fmwconcepts.com/imagemagick/digital_image_filtering.pdf>. (Year: 2020).*

Richman, Jeffrey, "What Is Real-Time Processing (In-depth Guide For Beginners)," Feb. 1, 2023. Estuary. <https://estuary.dev/what-is-real-time-processing/>. (Year: 2023).*

[No Author Listed] EyeSight Driver Assist Technology. Subaru. https://www.subaru.com/eyesight.html. Website first archived May 29, 2022; downloaded Aug. 24, 2023. 3 pages.

No Author Listed] Open Source Computer Vision Library. GitHub. https://github.com/opencv/opencv/tree/3.4.16. Dated Oct. 8, 2021; downloaded Aug. 24, 2023. 1 page.

[No Author Listed] Tesla Vision Update: Replacing Ultrasonic Sensors with Tesla Vision. Tesla. https://www.tesla.com/support/transitioning-tesla-vision. Webstite first archived May 25, 2021; current version first archived Oct. 2, 2022; downloaded Aug. 24, 2023. 2 pages.

Owano, Mercedes-Benz S-Class stability system uses sensors, stereo camera (w/ Video). Phys.org. https://phys.org/news/2013-09-mercedes-benz-s-class-stability-sensors-stereo.html. Dated Sep. 28, 2013; downloaded Aug. 24, 2023. 5 pages.

Liu et al., Kinect depth restoration via energy minimization with TV21 regularization. 2013 IEEE International Conference on Image Processing. Sep. 15, 2013:724.

Nam et al., Hole-Filling Methods Using Depth and Color Information for Generating Multiview Images. ETRI Journal. Oct. 2016;38(5):996-1007.

Tomasi et al., Bilateral filtering for gray and color images. IEEE Sixth International Conference on Computer Vision (IEEE Cat. No. 98CH36271). Jan. 7, 1998:839-46.

International Search Report and Written Opinion for International Application No. PCT/US2023/069020, mailed Oct. 19, 2023.

* cited by examiner

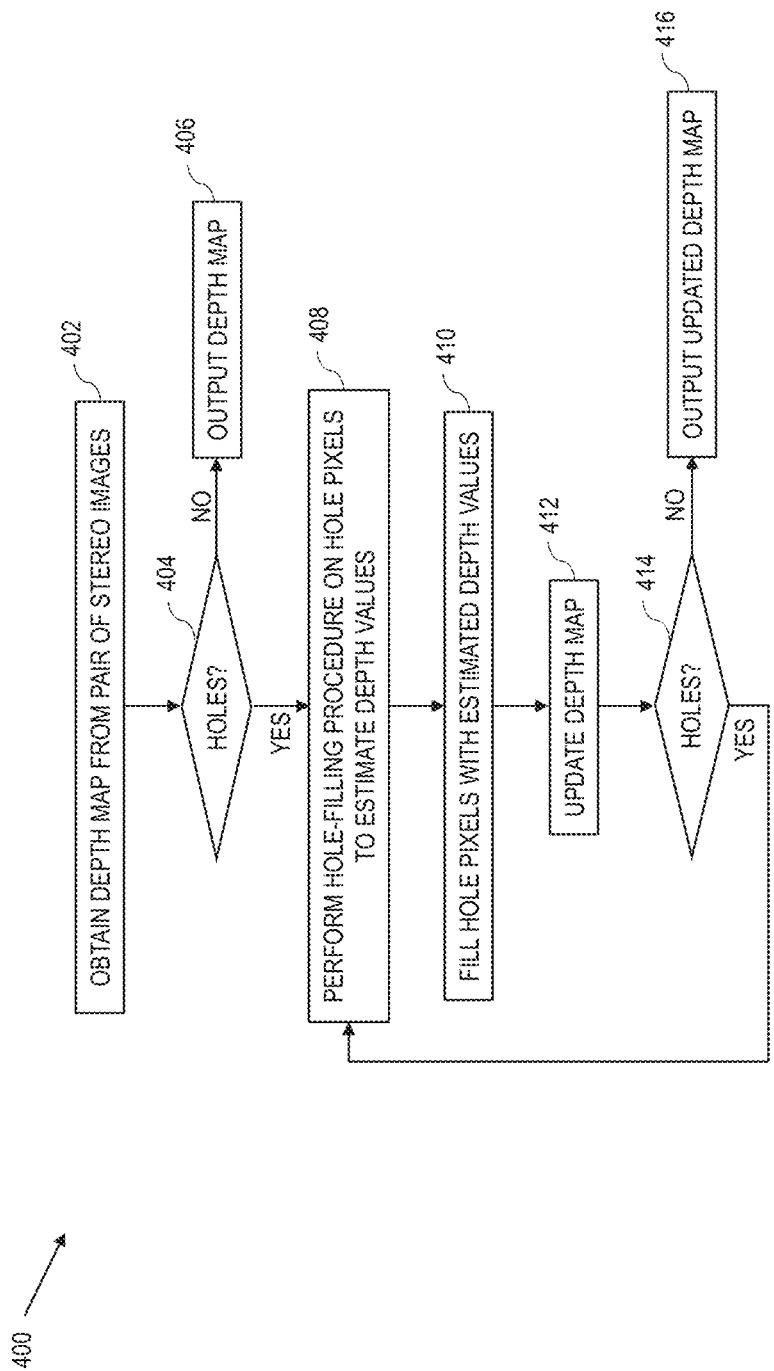

REAL-TIME CONFIDENCE-BASED IMAGE HOLE-FILLING FOR DEPTH MAPS

FIELD OF THE INVENTION

The technology of the present invention relates to three-dimensional (3D) vision systems that provide depth maps of a scene based on two-dimensional (2D) images captured of a scene. In particular, the present technology relates to techniques for repairing holes in depth maps by determining confidence-based depth estimates for the holes in real time or nearly real time. Such techniques may be applicable to vision systems on board autonomous vehicles and/or driver-assistance systems on board vehicles with drivers.

BACKGROUND 3D vision systems have become more and more widely used in industries where sight or vision is required for machinery to move in an unconstrained environment (e.g., at the speed limit on an interstate highway; at a crosswalk near pedestrians and vehicles; in a collapsed building; in a forest; etc.) to assist humans or, in some cases, to operate where humans may not be present. In one example, stereo vision systems may be part of autonomous robots deployed in search-and-rescue operations to assist humans in areas where it may be dangerous for a human to be present. In another example, stereo vision systems may be part of autonomous vehicles (e.g., trucks, automobiles, drones, etc.) to "see" nearby terrain and objects near and far (e.g., landmarks, road signs, other vehicles in traffic, etc.) in lieu of human eyes and to provide data to other onboard electronic systems that control movement of the vehicles. In yet another example, stereo vision systems may be used to assist drivers of vehicles to "see" upcoming hazards and warn the drivers to take action to avoid the hazards.

In order for 3D vision systems to be used to operate autonomous moving machines (e.g., autonomous robots, autonomous vehicles, etc.) safely, and/or to aid in safe operation of driver-assisted vehicles, it is desirable for the 3D vision systems to provide vision information that is reliable and accurate. Additionally, to allow sufficient time for autonomous moving machines to react safely in response to the vision information, and/or for drivers to take appropriate action to a warning resulting from the vision information, it is desirable for the vision information to be provided to control systems of the autonomous moving machines, and/or to monitoring systems of driver-assisted vehicles, in real time or nearly real time. For example, it is desirable for range or depth estimates determined by a vision system to be accurate and reliable, so that a control system of an autonomous vehicle may use the estimates to detect an upcoming road hazard and cause the vehicle to move to avoid the hazard. Such estimates may not be useful if they cannot be processed in time to permit the vehicle to be controlled to move safely to avoid the hazard. Therefore, it is particularly desirable for such estimates to be determined accurately and in real time or nearly real time in order for the vehicle, which may be moving at typical speed limits on an interstate highway, to have sufficient time to move safely to avoid the hazard.

Stereo vision systems typically use two cameras (e.g., left and right cameras) to produce 3D information of a scene captured by the cameras. The 3D information may include a two-dimensional (2D) image of the scene and an estimate of distance for each pixel of the image. The distance may be estimated by measuring a disparity or parallax between matched pixels in a left image captured by the left camera and a right image captured by the right camera simultaneously with the left image. As used herein, the terms "camera sensor" and "camera" may be used interchangeably to refer to a device configured to capture a 2D image of a scene. For example, U.S. Pat. No. 8,208,716 discloses a stereo vision system and a method that outputs a disparity map, which is a 2D matrix that contains pixel-shift data corresponding to a rectified image captured by one of the cameras (e.g., the left camera). An estimate of depth for each pixel of the image, corresponding to a distance from the camera to a portion of the scene in the pixel, may be computed from the disparity map because the depth of the pixel is inversely proportional to the disparity of the pixel. As such, the terms "depth map" and "disparity map" may be used interchangeably herein, because they provide very similar information about the scene of the image. However, a drawback with conventional stereo vision systems is that the 3D information may include occlusions or holes due to imaging problems that may occur during capturing of the 2D images. For example, dirt or other debris blocking a portion of one of the cameras may result in unreliable disparity measurements for a corresponding portion of the scene captured by the cameras. Similarly, inadequate lighting conditions and/or high reflectance and/or motion blur (e.g., from a moving animal) may result in missing regions in a depth map.

SUMMARY

Depth maps containing depth data for objects surrounding a motor vehicle have become a fundamental requirement for onboard driver assistance systems as well as for vision systems in autonomous (driverless) motor vehicles. Such systems may, for example, assist a driver with automated parallel parking, warn a driver of nearby objects while backing up, warn a driver of lane departures or drifting into an adjacent lane during highway driving, determine nearby and upcoming landmarks, lanes, road debris, pedestrians, other vehicles, shoulder objects, etc., and/or provide data for controlling the vehicle to avoid hazards while travelling safely to a desired destination. However, many factors may cause depth maps to have one or more regions where depth data cannot be determined accurately. For example, one or more occlusions may prevent a camera sensor from capturing an entirety of a scene, resulting in missing regions in a depth map of the scene. Such missing regions in depth maps may be referred to as "holes" herein. Similarly, holes may occur when there is an inadequate amount of lighting in a region of the scene, and/or an object in the scene has a high reflectance, and/or an object in the scene moves during imaging (e.g., a moving animal), resulting in motion-based blurriness in a captured image.

Depth-map holes are undesirable because they can create a false notion of an absence of objects at regions of the holes, also known as false negatives. In some cases, depth-map holes can lead to gross underestimations of object sizes, especially at long ranges (e.g., objects that are at large distances from the camera sensors used to capture the images). To address this problem, artificial intelligence may be used to predict or estimate depth data for a hole, to fill the hole in the depth map. Machine-learning models may be used to hallucinate depth data based on knowledge derived from training data comprising images with similar holes and known depths corresponding to those holes. Likewise, depth estimates of holes may be obtained using geometric models that leverage convolutions with fixed kernels, e.g., a Gaussian kernel. The inventors have recognized and appreciated that such model-based techniques often are computationally intensive and therefore expensive to implement, and/or do not produce a final pointcloud that preserves an object's sharpness, due to the simple interpolations of the models, and/or cannot yield useful data in real time or nearly real time.

The inventors have developed a new technique, disclosed herein, for filling holes in a depth map. The holes are filled by a process that utilizes a non-uniform convolution kernel based on extrapolation and/or interpolation principles. Aspects of the disclosed technique may be performed in parallel, such that a corrected depth map, in which at least some of the holes of the depth map have been filled, may be output in real time or nearly real time to when images for producing the depth map are captured (e.g., within 1 second, or within 0.5 second, or within 0.1 second).

According to an aspect of the present technology, a method is provided for repairing a 3D image generated by a vision system on a vehicle. The method may comprise: (a) obtaining a three-dimensional (3D) image of a scene, the 3D image corresponding to a depth map of the scene generated from at least one two-dimensional (2D) image captured of the scene, wherein: the 3D image comprises a plurality of pixels arranged in a matrix H, and the pixels comprise first pixels and second pixels, each of the first pixels having a first pixel value corresponding to a depth value for a portion of the scene represented by the first pixel, and each of the second pixels corresponding to a hole having an unknown depth value for a portion of the scene represented by the second pixel; (b) determining a confidence mask matrix C for the 3D image; (c) for each of at least some of the second pixels: determining a kernel G of neighboring pixels of the second pixel, the neighboring pixels of the kernel G having values corresponding to a predetermined distribution, and convolving the kernel G with a portion of the confidence mask matrix C and a portion of the matrix H corresponding to the kernel G to obtain an estimated depth value for the second pixel; (d) generating a corrected matrix $\hat{H}$ representing a corrected 3D image, the corrected matrix $\hat{H}$ comprising the first pixels and corrected second pixels, wherein the corrected second pixels correspond to the second pixels corrected to have second pixel values corresponding to the estimated depth values; and outputting data corresponding to at least a portion of the corrected matrix $\hat{H}$ to the vehicle. A total number of holes in the matrix H is greater than a total number of holes in the corrected matrix $\hat{H}$.

In some embodiments of this aspect, the outputting may occur in real time or nearly real time to a time when the at least one 2D image is captured of the scene.

In some embodiments of this aspect, when the kernel G of the second pixel comprises none of the first pixels, the second pixel may remain a hole in the corrected matrix $\hat{H}$.

In some embodiments of this aspect, the corrected 3D image may comprise: at least some of the first pixels of the 3D image, and at least some of the corrected second pixels.

In some embodiments of this aspect, the outputting may output data corresponding to at least a portion of the corrected matrix $\hat{H}$ to at least one electronic control unit (ECU) of the vehicle.

In some embodiments of this aspect, the outputting may output data corresponding to at least a portion of the corrected matrix $\hat{H}$ to a computer controller of the vehicle.

In some embodiments of this aspect, the outputting may output data corresponding to at least a portion of the corrected matrix $\hat{H}$ to a display monitor of the automobile.

In some embodiments of this aspect, the outputting may output data corresponding to some or all of the corrected 3D image to a display of the automobile.

In some embodiments of this aspect, the outputting may output data corresponding to at least a portion of the corrected matrix $\hat{H}$ to a transmitter of the vehicle for transmission to a computer external to the vehicle. In some embodiments, the computer external to the vehicle may be a computer of a second vehicle. In some embodiments, the vehicle may be a first moving vehicle and the second vehicle is a second moving vehicle.

In some embodiments of this aspect, the outputting may occur within 1 second of when the at least one 2D image is captured of the scene.

In some embodiments of this aspect, the outputting may occur within 0.1 sec of when the at least one 2D image is captured of the scene.

In some embodiments of this aspect, the outputting may occur within 0.01 second when the at least one 2D image is captured of the scene.

In some embodiments of this aspect, the outputting may occur within 1 millisecond of when the at least one 2D image is captured of the scene.

In some embodiments of this aspect, the 3D image of the scene may be part of a real-time video stream obtained from a vision system on the vehicle.

In some embodiments of this aspect, the method may further comprise: repeating (a) through (d) using the corrected 3D image as the 3D image of the scene.

In some embodiments of this aspect, the confidence mask matrix C and the matrix H may have a same size, elements of the confidence mask matrix C corresponding to the first pixels may have a first value, and elements of the confidence mask matrix C corresponding to the second pixels may have a second value different from the first value. In some embodiments, the first value may be 1. In some embodiments, the second value may be 0. In some embodiments, each of the confidence mask matrix C, the matrix H, and the corrected matrix $\hat{H}$ may comprise M rows and N columns such that a set I of indices for the confidence mask matrix C, the matrix H, and the corrected matrix $\hat{H}$ may be given by:

$$I=\{(i,j) | 1 \leq i \leq M, 1 \leq j \leq N\},$$

And elements $c_{ij}$ of the confidence mask matrix C have values given by:

$$c_{ij} = \begin{cases} 1, & \text{if } (i,j) \text{ is for one of the first pixels} \\ 0, & \text{if } (i,j) \text{ is for one of the second pixels}. \end{cases}$$

In some embodiments, in (c), the determining of the kernel G of neighboring pixels may determine the kernel G to have a size of 2K+1, where K is a natural number greater than 0. In some embodiments, the natural number is in a range of 1 to 30. For example, the natural number may be in a range of 3 to 15. In some embodiments, the kernel G may be a square kernel. In some embodiments, the corrected second pixels of the corrected matrix $\hat{H}$ may have values corresponding to the estimated depth values for the second pixels, and elements $\hat{h}_{ij}$ of the corrected matrix $\hat{H}$ corresponding to the corrected second pixels may have values given by:

$$\hat{h}_{ij} = \sum_{p=-K}^{K} \sum_{q=-K}^{K} H(i-p, j-q) C(i-p, j-q) G(K-p, K-q),$$

where a set Γ of indices (p, q) for the kernel G may be given by:

$$\Gamma=\{(p,q)|-K\leq p\leq K, -K\leq q\leq K\}.$$

In some embodiments, the estimated depth values may be normalized estimated depth values calculated using the confidence mask matrix C, and elements $\langle \hat{h}_{ij}\rangle$ of the corrected matrix H corresponding to the corrected second pixels may have values given by:

$$\langle \hat{h}_{ij}\rangle = \frac{\hat{h}_{ij}}{\hat{c}_{ij}+\varepsilon},$$

where $\hat{h}_{ij}$ may correspond to unnormalized values given by:

$$\hat{h}_{ij} = \sum_{p=-K}^{K}\sum_{q=-K}^{K}H(i-p,j-q)C(i-p,j-q)G(K-p,K-q),$$

where a set Γ of indices (p, q) for the kernel G may be given by:

$$\Gamma=(\{(p,q)|-K\leq p\leq K, -K\leq q\leq K\}$$

where $\hat{c}_{ij}$ may be elements of a weight normalization matrix $\hat{C}$ obtained by, for each of the at least some of the second pixels, convolving the kernel G with a corresponding portion of the confidence mask matrix C according to:

$$\hat{c}_{ij} = \sum_{p=-K}^{K}\sum_{q=-K}^{K}C(i-p,j-q)G(K-p,K-q),$$

where ε is a non-zero constant. In some embodiments, ε may have a value in a range from 0.00001 to 0.001. For example, e may have a value of 0.00001 or smaller.

According to another aspect of the present technology, a system is provided for repairing a 3D image generated by a vision system on a vehicle. The system may comprise at least one computer processor coupled to a memory. The at least one computer processor may be configured to perform some or all of the embodiments of the above method.

According to another aspect of the present technology, a non-transitory computer-readable storage medium is provided. The storage medium may store computer-executable code that, when executed by a processing system comprising at least one computer processor, causes the processing system to perform some or all of the embodiments of the above method.

The foregoing features may be used, separately or together in any combination, in any of the embodiments discussed herein.

BRIEF DESCRIPTION OF DRAWINGS

The present patent or patent application file contains at least one drawing executed in color. Copies of this patent or patent application publication with color drawings will be provided by the Office upon request and payment of the necessary fee.

Various aspects and embodiments of the present technology disclosed herein are described below with reference to the accompanying figures. It should be appreciated that the figures are not necessarily drawn to scale. Items appearing in multiple figures may be indicated by the same reference numeral. For the purposes of clarity, not every component may be labeled in every figure.

FIG. 4 shows a flow diagram of operations performed by a hole-filling module of a vision system, according to some embodiments of the present technology.

FIG. 5B schematically shows an example of an updated depth map corresponding to the depth map of FIG. 5A, in which the holes have been filled or reduced in size.

FIG. 5C schematically shows an example of a further updated depth map corresponding to the updated depth of FIG. 5B, in which all the holes have been filled.

DETAILED DESCRIPTION

Figure 1:
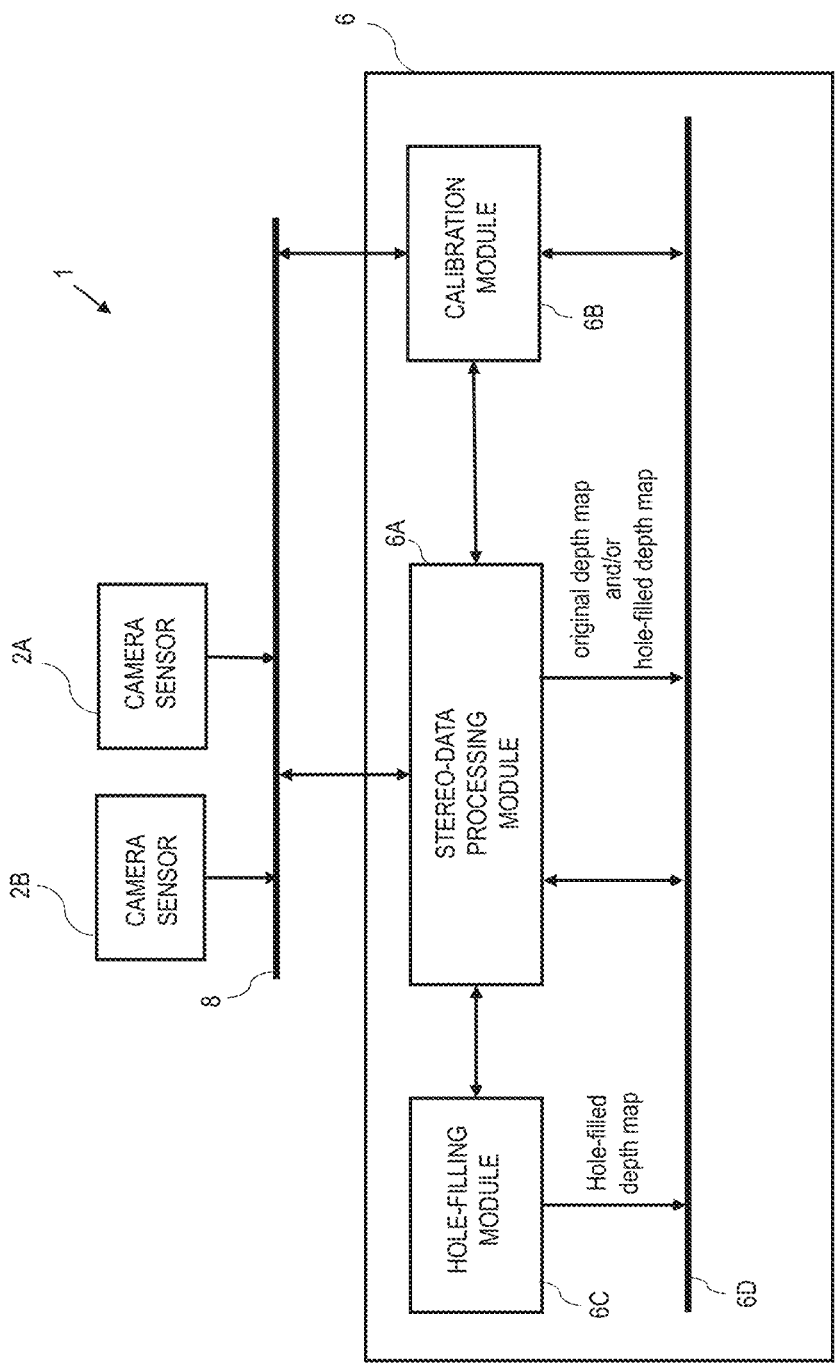
FIG. 1 shows a block diagram of a 3D vision system, according to some embodiments of the present technology.

As noted above, depth maps have become fundamental tools for onboard driver assistance systems as well as for onboard vision systems in autonomous (driverless) motor vehicles (e.g., trucks, passenger vehicles, etc.). With respect to autonomous vehicles, accurate depth maps may be essential because depth information is relied upon to make important decisions for controlling the vehicles, as there may be no humans in the vehicles.

Safe operation of autonomous vehicles may rely on depth information from vision systems to navigate in their environments. A vision system that senses depths over a large depth range may be used advantageously to perceive objects near and far. For example, an autonomous vehicle may use depth-sensing technology of an onboard vision system to perceive objects, road signs, landmarks, and other navigational information in a 3D environment in which the vehicle is travelling. The vision system may perform perception tasks that include, but are not limited to, object detection, tracking of detected objects, lane detection, semantic segmentation, localization, and hole filling. Object detection may, for example, entail identifying a type of an object in an image (e.g., a cat, a rock, a brick, etc.), its pose, and a bounding box. Object tracking may, for example, involve keeping track of a detected object's location, which may be particularly useful for moving objects such as animals, vehicles, debris bouncing on the road, etc. Lane detection may, for example, entail identifying, in an image, left and right boundaries of a lane in which the ego vehicle is travelling and optionally may also entail identifying boundaries of neighboring lanes. Semantic segmentation may, for example, entail categorizing each pixel of an image as one or another of a list of different categories (e.g., sky, rock, tree, water, grass, cloud, dog, etc.). Localization may, for example, entail computing the ego vehicle's position relative to its surroundings. The perception system may couple information obtained from such perception tasks to depth information calculated from stereo images to determine, for example, how quickly action must be taken to avoid hitting an object and/or what type of action(s) can be taken to avoid hitting the object. Techniques useable for object detection may be found in WO 2023/059365 A1, the entirety of which is incorporated by reference herein. Hole filling according to aspects of the present technology is discussed herein.

Fast and accurate determination of depth over a wide range of depths is important to perceiving objects relative to a moving vehicle. Objects that are far away may appear small in an image and therefore depth-map holes may mask the presence of the far-away objects. However, even though the objects may be far away, knowledge of their presence may be significant for controlling vehicles to maneuver around them. For relatively fast-moving vehicles, such as an autonomous vehicle travelling at 100 kilometers per hour (or about 30 meters per second) on a highway, an ability to perceive objects and road boundaries at or beyond a minimum distance of 100 meters is desirable in order to have sufficient reaction time to plan for and move to a safer path and avoid the objects. Heavier vehicles (e.g., trucks loaded with cargo) may require a larger minimum distance, to account for their relatively longer stopping distances due to momentum-related considerations, in comparison with lighter vehicles (e.g., passenger cars). For example, a loaded truck traveling at legal highway speeds may need to perceive objects at a minimum distance of about 200 meters or greater, to be able to come to a complete stop. Under adverse road conditions (e.g., snow, ice, rain), this stopping distance may need to be even greater due to the potential for skidding. If it takes several seconds or more to obtain accurate depth data for road debris at a depth of about 1 kilometer, that depth data may be of questionable value for controlling a moving vehicle because the vehicle may be on top of the road debris by the time the depth data is available for use. Therefore, not only is accuracy of depth data important but processing time also is important. For relatively slow-moving vehicles, there may be less of an urgency to obtain accurate depth data for far-away objects; however, such vehicles may be operating in densely populated areas (e.g., urban cities, downtown sections of rural towns, shopping plazas, etc.) where there may be a need to react particularly quickly to objects that are very close to the vehicle. For example, a runaway shopping cart, a child chasing a ball, a cyclist or a pedestrian not obeying right-of-way rules, etc.) may suddenly appear within 3 meters or less of the vehicle, requiring quick evasive action. However, moving objects may result in depth-map holes due to motion blurring in images captured by camera sensors. Thus, a vision system that is able to reduce the number of depth-map holes or even eliminate all such holes in real time or nearly real time is highly desirable, particularly for use in autonomous vehicles.

Driver assistance systems in human-controlled vehicles and vision systems in autonomous vehicles (collectively "vision systems") typically rely on onboard sensors to capture images of environments in which the vehicles are travelling. Cameras are a popular type of sensor for autonomous vehicles due to their relatively low cost and ability to capture images at high frame rates (e.g., 30 frames per second (FPS) or higher) in various levels of detail ranging from less than 1 megapixel (MP) to 5 MP or greater in RGB color. Vision systems based on stereo cameras are currently in use or being considered for use in vehicles produced by a number of automobile manufacturers, such as Mercedes-Benz [1], Tesla [2], and Subaru [3], to name a few.

A stereo-camera system may include two camera sensors controlled to capture 2D images of a scene simultaneously. The camera sensors may be mounted on the vehicle so that the images may be captured while the vehicle is moving. Data corresponding to the images may be used to produce a depth map that provides distances or depths to objects in the scene. The depth map may, in turn, be used to produce a 3D environment map, which may be a depth map that includes information identifying particular objects in the vehicle's surroundings (e.g., pedestrians, other vehicles, pot-holes, debris, road surface(s), road marking(s), etc.). This information may be aggregated over time and used by one or more controllers of the vehicle to make decisions about when and how to maneuver the vehicle. For example, decisions regarding which lane to follow, operating speed, steering angle, etc., may be made based on information in the environment map. However, one of or both of the 2D images may have regions of missing data. As noted above, occlusions and/or lighting deficiencies and/or high reflectance and/or motion-based blurriness may give rise to depth-map holes. The inventors have recognized and appreciated that a vision system that is able to fill such holes in real time or nearly real time, with depth data that is reliable and based on information relating to non-hole regions surrounding the holes, may lead to safer operation of a vehicle that uses the vision system to control the vehicle's movement.

On the one hand, a conservative approach to hole-filling may assume that depth-map holes correspond to objects. Such an approach, however, would be counter-productive. That is, instead of leading to safer operation of a vehicle, the vehicle would be controlled to brake frequently to avoid phantom objects that do not, in fact, exist. On the other hand, assuming that holes correspond to empty spaces, i.e., regions without objects, may lead to navigating into actual objects that were assumed to be empty spaces, which clearly is dangerous.

A conventional way to fill holes in a depth map may utilize a dilation technique, in which a depth of a pixel p of a hole in the depth map is assigned based on a maximum (or minimum) depth of the pixel p's neighbors in the depth map. Although computational operations for the dilation technique may be performed quickly, a resulting hole-filled depth map may have an increased amount of noise relative to the depth map before filling. Other conventional ways to fill holes may utilize filtering techniques (e.g., averaging, Gaussian blur, median filtering, and the like) [4]. Such other techniques tend to be more robust to outliers than the dilation technique and may result in a smoother transition from object boundaries to the holes. For example, the Gaussian blur technique may assign to a pixel p of a hole a weighted average of neighboring pixels, which allows this technique to be less susceptible to producing results that exhibit extreme or abrupt changes from neighboring non-hole pixels. However, an increased smoothness in a depth map may often be a double-edged sword when visualized in 3D. That is, although the increased smoothness may be associated with a lower amount of noise, a corresponding 3D pointcloud may manifest in a blending together of multiple objects, which may cause misidentification of objects. Another conventional way to fill holes may use a bilateral filtering technique [5], in which weights are assigned to neighboring pixels of the pixel p based on spatial location as well as pixel values, i.e., depth values of the neighboring pixels. A beneficial aspect of the bilateral filtering technique is that it may preserve edge features of objects in the hole-filled depth map relative to the depth map before hole-filling. However, such a benefit entails a significant computational cost, which may increase the time and/or the computing power required to perform the required computations. Also, the bilateral filtering technique may not be scaled easily to fill holes scattered around a large depth map and/or to fill a large hole in a depth map.

Depth-inpainting [6], [7] is a sophisticated conventional technique that fuses a depth map with RGB color data of a color image to correlate missing depth data from the color data. In this technique, correlation models are estimated from cost minimization algorithms, which may be computationally intensive and therefore may be difficult to run in real time or nearly real time on an autonomous platform like a car or truck.

The inventors have recognized and appreciated the difficulty in implementing depth-inpainting in a real-world environment of an autonomous moving vehicle as well as the drawbacks of other conventional techniques, and have developed a technique to balance the desire for a light-weight algorithm, which can be run in real time or nearly real time, and the competing desire for robust hole-filling that addresses the drawbacks of the conventional techniques noted above. Disclosed herein is a confidence-aware hole-filling technique that is able to preserve general shapes of objects in 3D. Aspects of the disclosed technique may utilize in-built functions in the Open Source Computer Vision Library or "OpenCV" [4], which is an open-source computer-vision and machine-learning software library, to render a non-linear kernel that diffuses depth information to the holes from their surroundings. Aspects of the disclosed technique are parallelizable, i.e., they may be performed in parallel, thus reducing computation time. Furthermore, parallelization in the disclosed technique may utilize the CUDA® (Compute Unified Device Architecture) platform to improve parallel-processing efficiency, to further reduce computation time. The disclosed technique may be used to perform robust hole-filling that preserves useful object-edge information to fill holes in depth maps in real time or nearly real time. Therefore, a vision system utilizing the disclosed technique may provide an increased level of safety by providing a clearer identification of upcoming objects, relative to vision systems that use conventional hole-filling techniques or no hole-filling technique, even for vehicles traveling at typical highway speed limits.

Turning now to the figures, FIG. 1 is a block diagram of a vision system 1, according to some embodiments of the present technology. The vision system 1 may be configured to be carried by an autonomous vehicle capable of moving without human intervention (e.g., an autonomous truck, an autonomous car, an autonomous robot, an autonomous aircraft, an autonomous sailing vessel, etc.), or may be part of a driver assistance system carried by a human-controlled vehicle. The vision system 1 may comprise a pair of stereo camera sensors 2A, 2B connected to a computer processing system 6 via a communication bus 8 or via a known wireless communication technique.

Figure 2:
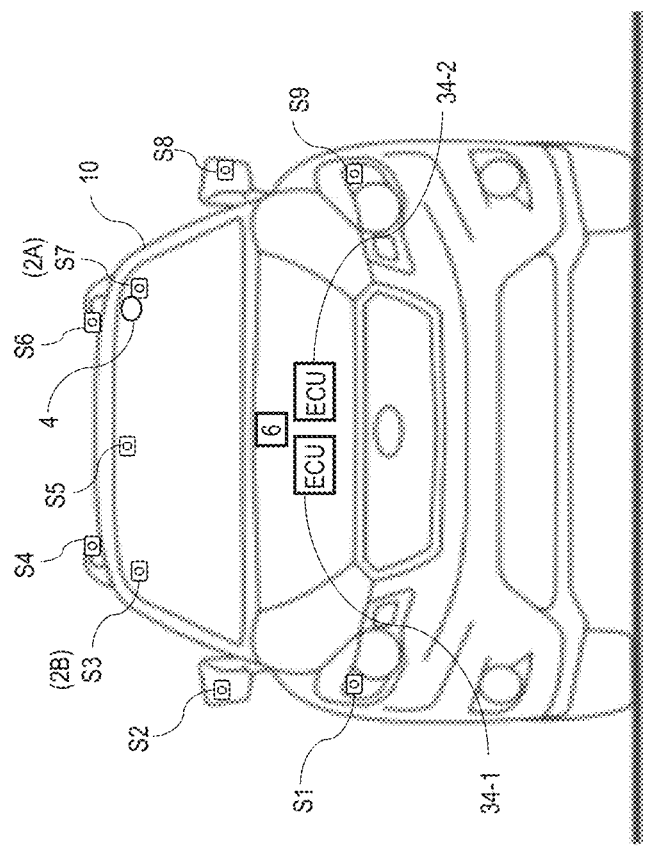
FIG. 2 schematically shows an autonomous vehicle, according to some embodiments of the present technology.

According to some embodiments of the present technology, the vehicle carrying the vision system 1 may be a car 10 and the camera sensors 2A, 2B may comprise any two of a plurality of cameras sensors S1, S2, . . . , S9 deployed on the car 10, as depicted in FIG. 2. For example, as depicted in FIG. 2, the camera sensor 2A may comprise the sensor S7, and the camera sensor 2B may comprise the sensor S3. The camera sensors 2A, 2B may be configured to capture images of the car's environment simultaneously, i.e., at the same or nearly the same moment of time. Although the camera sensors 2A, 2B may be referred to herein as "right" and "left" cameras or "right" and "left" sensors, they need not be positioned in a horizontal configuration but may instead be positioned in a vertical configuration (e.g., top and bottom) relative to each other, or diagonally relative to each other, or offset in different range bins (e.g., one camera may be at a front portion of the car 10 and the other camera may be at a rear portion of the car 10). The cameras sensors 2A, 2B may comprise, e.g., color CMOS (complementary metal-oxide-semiconductor) cameras, grayscale CMOS cameras, CCD (charge-coupled device) cameras, SWIR (short-wavelength infrared) cameras, LWIR (long-wavelength infrared) cameras, or focal-plane array sensors.

According to some embodiments of the present technology, the computer processing system 6 of the vision system 1 may comprise at least one computer processor coupled to at least one memory. The at least one memory may store a stereo-data processing module 6A, a calibration module 6B, and a hole-filling module 6C. In some embodiments, the stereo-data processing module 6A may store code that is executed by the at least one computer processor, the calibration module 6B may store code that is executed by the at least one computer processor, and the hole-filling module 6C may store code that is executed by the at least one computer processor. In some embodiments, each of the processing modules 6A, 6B, 6C may be coupled to its own computer processor dedicated to executing the code stored in its corresponding processing module. In such embodiments, each of the dedicated computer processors may be in communication with each other via a communication bus 6D or via a known wireless communication means. In some embodiments, the communication bus 6D may be the same as or connected to the communication bus 8. In some other embodiments, all of the processing modules 6A, 6B, 6C may be coupled to a single computer processor configured to execute the code of some or all of the processing modules 6A, 6B, 6C in parallel. Operations of the processing modules 6A, 6B, 6C are discussed below.

Figure 3:
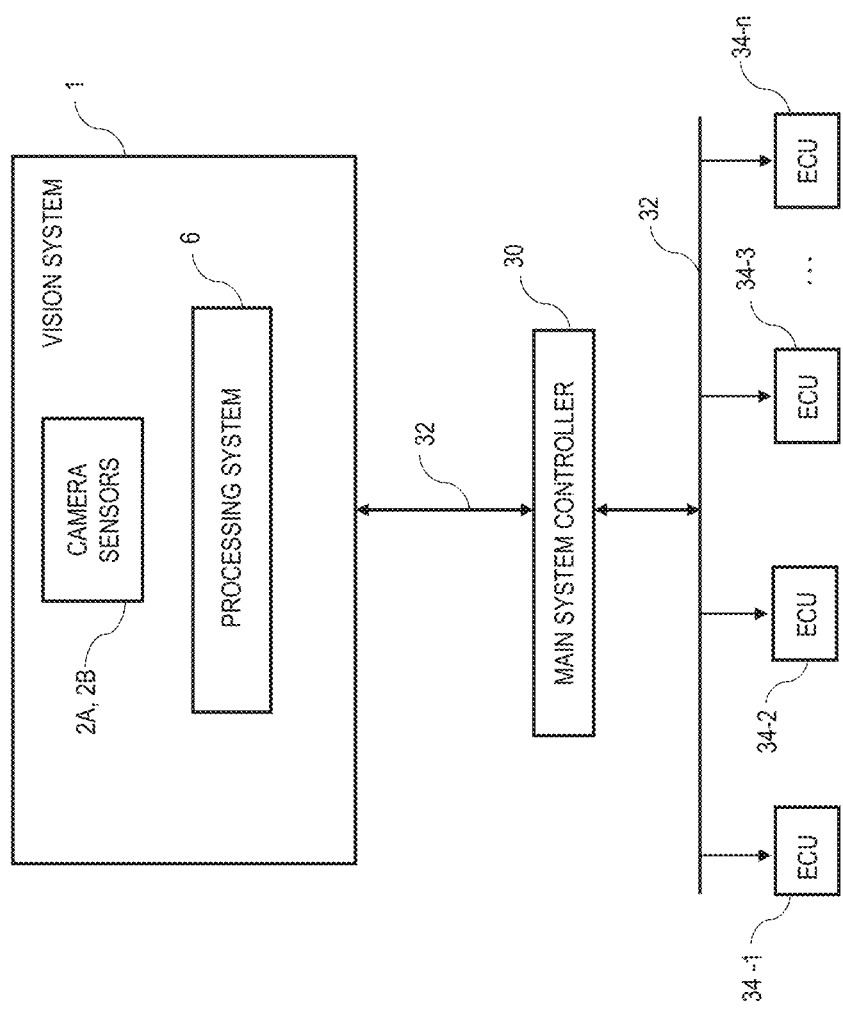
FIG. 3 shows a block diagram of a vision system coupled to electronics of an autonomous vehicle, according to some embodiments of the present technology.

According to some embodiments of the present technology, the vision system 1 may be coupled to a main system controller 30 of the car 10, as schematically shown in FIG. 3. In some embodiments, the main system controller 30 may be the car's control system, which may be configured to control all automated aspects of operation of the car 10. In some embodiments, the vision system 1 may be configured to be commanded by the main system controller 30, and may communicate signals to and receive signals from the main system controller 30 via a command and control line 32. As will be appreciated, the command and control line 32 may be a wired communication mechanism (e.g., a data bus, a communication line) or may be a wireless communication mechanism using communication techniques known in the art. In some embodiments, the main system controller 30 may comprise at least one computer processor configured to orchestrate high-level functions (e.g., automatic emergency braking, route selection, etc.) and to communicate with various sub-systems or electronic control units (ECUs) 34-1, 34-2, 34-3, . . . , 34-n and with the vision system 1 to carry out the high-level functions. In some embodiments, common communication protocols may be used for communication via the command and control line 32 (e.g., Ethernet, CAN (Controller Area Network), I2C (Inter-Integrated Circuit), LIN (Local Interconnect Network), etc.). Although the vision system 1 is shown in FIG. 3 to be separate from the main system controller 30, the vision system 1 may, in some embodiments, be part of the main system controller 30 and may, in some embodiments, be physically located in a housing of the main system controller 30.

According to some embodiments of the present technology, the main system controller 30 or a control module (not shown) of the computer processing system 6 of the vision system 1 may be configured to control the camera sensors 2A, 2B to capture images synchronously with each other. For example, the synchronous images may be part of two video streams comprising frames or images captured simultaneously at regular intervals (e.g., every 0.1 second, or every 0.5 second, or every 1 second, or every 1.5 second, etc.) and provided to the stereo-data processing module 6A as a stream of stereo-image pairs.

According to some embodiments of the present technology, a result that is output in real time or nearly real time may refer to a result that is output within 1 second (e.g., within 0.5 second, or within 0.2 second, or within 0.1 second, or within 10 milliseconds, or within 1 millisecond) of when data for determining the result is provided to a device that performs the determining and that outputs the result. In some embodiments, the stereo-data processing module 6A may output a hole-filled depth map corresponding to a pair of stereo images within 1 second of when the pair of stereo images is provided to the stereo-data processing module 6A. In some embodiments, the stereo-data processing module 6A may output a hole-filled depth map corresponding to a pair of stereo images within 0.1 second (i.e., within 100 milliseconds) of when the pair of stereo images are captured by the camera sensors 2A, 2B. In some embodiments, instead of the stereo-data processing module 6A outputting the hole-filled depth map, i.e., the updated depth map, the hole-filled (updated) depth map may be generated and outputted directly by the hole-filling module 6C.

Returning to FIG. 1, as noted above, the camera sensors 2A, 2B may be coupled to the stereo-data processing module 6A via the communication bus 8 or via a wireless communication technique. According to some embodiments of the present technology, image data of a scene captured by the camera sensors 2A, 2B may be transferred via a known communication interface (e.g., a USB (Universal Serial Bus) connector, an Ethernet connector, a MIPI (Mobile Industry Processor Interface) CSI (Camera Serial Interface) connector, GMSL (Gigabit Multimedia Serial Link) connector, Flat Panel Display Link (FPD-Link) connector, and the like). In some embodiments, the camera sensors 2A, 2B may be configured to transmit the image data to the stereo-data processing module 6A in real time or nearly real time, directly or via a buffer memory device (e.g., RAM), which may be incorporated in the camera sensors 2A, 2B. In some embodiments, the camera sensors 2A, 2B may be associated with a data-storage memory device (not shown) accessible by the stereo-data processing module 6A as well as other parts of the computer processing system 6, and the camera sensors 2A, 2B may be configured to transmit the image data to the data storage device. As mentioned above, the camera sensors 2A, 2B may be video sensors configured to capture streams of video data of the scene. The streams of video data may be comprised of a left stream and a right stream, with each stream being comprised of a sequence of frames. Thus, the term "image data" as used herein may refer to frames of video data, in some embodiments.

According to some embodiments of the present technology, the stereo-data processing module 6A may communicate information obtained from the image data provided by the camera sensors 2A, 2B to the calibration module 6B via the communication bus 8 for electronic calibration of the camera sensors 2A, 2B. The calibration module 6B may, in turn, process the information and provide calibration parameters to the stereo-data processing module 6A for rectifying the image data provided by the camera sensors 2A, 2B more accurately. Calibration may be performed in real time or nearly real time for every pair of stereo images or periodically (e.g., every other pair of stereo images, or every $5^{th}$ pair of stereo images, or every $10^{th}$ pair of stereo images, etc.). Calibration techniques that may be performed by the calibration module 6B are described in U.S. Pat. No. 11,282,234, the entirety of which is incorporated by reference herein. In some embodiments, electronic calibration of the camera sensors 2A, 2B may take place at the camera sensors 2A, 2B. In such embodiments, the camera sensors 2A, 2B may communicate directly with the calibration module 6B such that current calibration information and/or image data may be provided from the camera sensors 2A, 2B to the calibration module 6B and such that updated calibration information may be provided from the calibration module 6B to the camera sensors 2A, 2B.

The inventors have recognized and appreciated that an intelligent and novel way to handle depth-map holes is to leverage known depths of structures and spaces of the scene captured in the 2D images, i.e., the 3D information, to fill the holes. That is, non-hole depth information of a depth map may be used in a hole-filling process to reduce the size of or even eliminate the presence of holes in the depth map. The hole-filling process may be broadly described as a process that evaluates a depth map on a pixel-by-pixel basis to determine which pixels have depth information and therefore are non-hole pixels and which pixels do not have depth information and therefore are hole pixels. For each of at least some of the hole pixels of the depth map, the hole-filling process may pool information of non-hole pixels of neighboring regions surrounding the hole pixel to assess an estimated depth value for the hole pixel. The estimated depth values assessed for the hole pixels may be used to produce an updated depth map in which the holes have been filled at least partially. That is, previously existing holes may be reduced in size and, in some cases, eliminated altogether in the updated depth map. Such an approach to handling holes may lead to a smoother control of an autonomous vehicle relative to the conservative approaches mentioned above, and also may lead to a safer control of the vehicle relative to techniques that assume the holes correspond to empty spaces. Estimation techniques described herein may provide a reasonable prediction of an object's size and distance, thus permitting onboard control systems to make better-informed decisions on how to maneuver the vehicle safely.

Figure 5A:
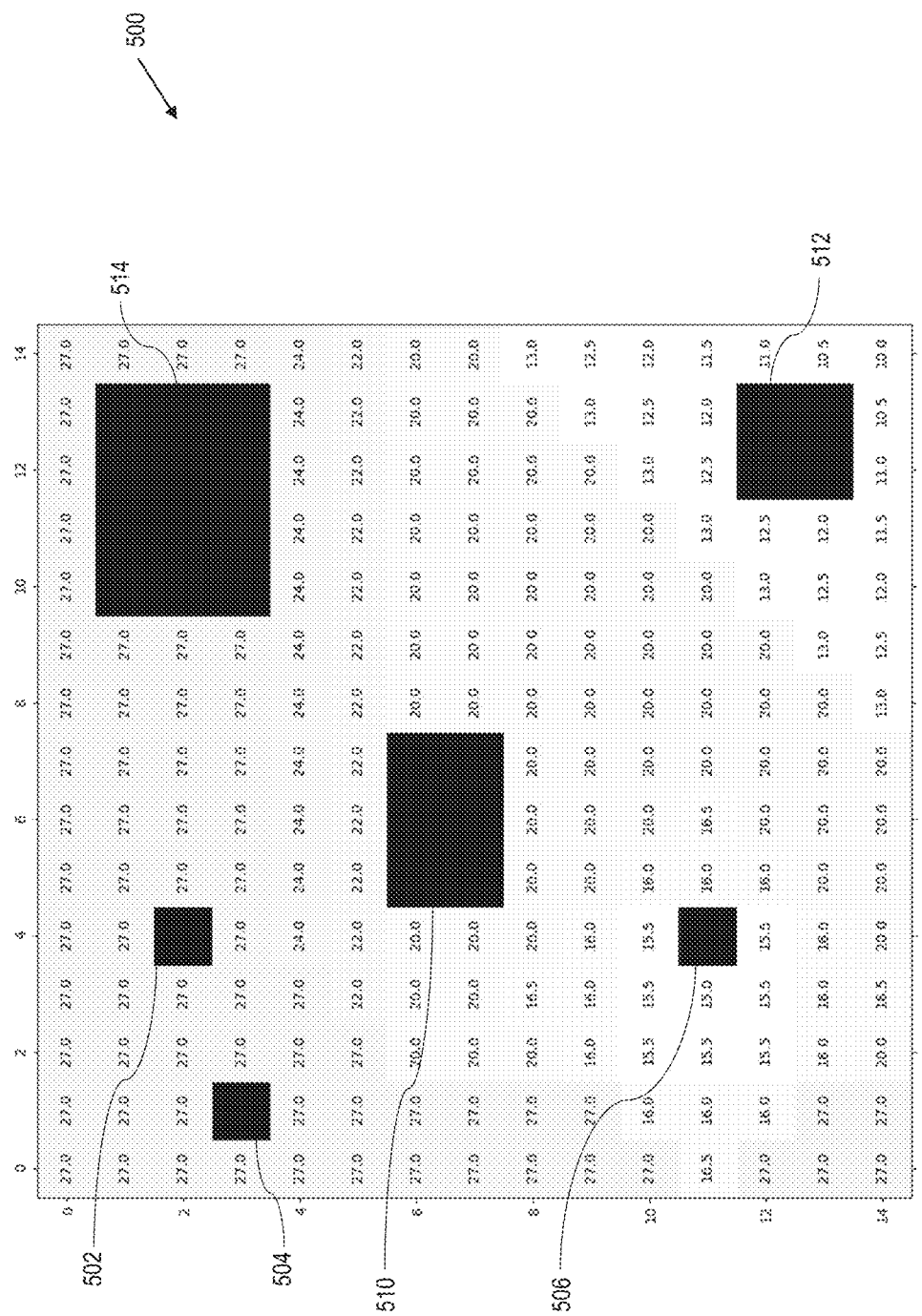
FIG. 5A schematically shows an example of depth map comprising a plurality of holes.

FIG. 4 shows a flow diagram of a hole-filling process 400, according to some embodiments of the present technology. The process 400 may be performed by the stereo-data processing module 6A and the hole-filling module 6C of the computer processing system 6. At act 402, a depth map is obtained for a scene captured in a pair of stereo images. FIG. 5A schematically shows an example of a depth map 500 comprising holes. In some embodiments, the depth map may be a disparity map generated by the stereo-data processing module 6A based on stereo images of a scene captured simultaneously by the camera sensors 2A, 2B on board the car 10. In some embodiments, the depth map may be provided to the computer processing system 6 from an external source. The depth map may be a 2D map comprising pixels having pixel values corresponding to depths or distances. The depth map may result from a stereo-matching process performed on the pair of stereo images to match pixels on a pixel-by-pixel basis, to determine a depth of a portion of the scene corresponding to the matched pair of pixels. In some embodiments, the depth may be calculated for a matched pair of pixels based on a disparity of the matched pair of pixels, using expression (1):

$$D = \frac{fb}{d}. \quad (1)$$

In expression (1), D is the distance or depth at the portion of the scene corresponding to the marched pair of pixels, f is the focal length of the camera sensor (e.g., the left camera sensor 2B), b is the baseline or direct distance between the right camera sensor 2A and the left camera sensor 2B, and d is the disparity between the matched pair of pixels.

At act 404, the depth map is evaluated to determine whether one or more holes are present in a region of interest. For example, the stereo-data processing module 6A may generate the depth map and evaluate the depth map before outputting the depth map to the main system controller 30. The region of interest may be an entirety of the pixels of the depth map, or may be a predetermined section of the depth map (e.g., a lower left quadrant, a central section excluding left and right sections, etc.), or may exclude pixels at one or more predetermined sections. For example, an outer x rows and an outer y columns of pixels of the depth map may be excluded, where x and/or y may be in a range of 2 through 20 (e.g., 2 or 5 or 10 or 15, etc.). In another example, a portion of the depth map corresponding to where pixels cannot be matched due to the relative positions of the camera sensors 2A, 2B may be excluded from the region of interest. If no holes are present in the region of interest, the depth map is outputted at act 406. In some embodiments of the present technology, at act 406, data corresponding to the depth map may be outputted to the main system controller 30 of the car 10. If holes are present, the process 400 proceeds to act 408, where a hole-filling procedure is performed on pixels of the holes (also referred to as "hole pixels" herein) on a pixel-by-pixel basis to estimate depth values for each of the hole pixels. For example, the stereo-data processing module 6A may provide the depth map to the hole-filling module 6C if holes are determined to be present in the region of interest. Details of a hole-filling procedure according to some embodiments of the present technology are described below.

The hole-filling procedure may be performed on individual hole pixels in parallel, because computational results for any one of the hole pixels are not required for performing the hole-filling procedure on another one of the hole pixels. A beneficial aspect of some embodiments of the present technology is that the process 400 may take advantage of technology developed for parallel processing of data to reduce the amount of time needed to fill holes in a depth map without sacrificing computational complexity and without sacrificing a more detail-rich updated depth map for the sake of increased speed. Various embodiments of the present technology may be used to output an updated depth map containing fewer holes or no holes relative to an initial or "raw" depth map, and with edge sharpness of object boundaries preserved, and the updated depth may be outputted in real time or nearly real time. The parallel processing may use known techniques and/or known devices to increase processing speed, including any one or any combination of: multiple CPUs, a multi-core CPU, multi-threading techniques, and the like.

At act 410, which may occur after act 408 or partially concurrently with act 408, estimated depth values that have been determined for some of the hole pixels may be used to fill those hole pixels. Thus, according to some embodiments of the present technology, the hole pixels may be filled on a rolling basis, as estimated depth values are determined. When all the hole pixels in the region of interest have undergone the hole-filling procedure of act 408 and the estimated depth values have been used to fill the hole pixels at act 410, an updated depth map is completed at act 412. Alternatively, in some embodiments, the hole-filling procedure may be performed in parallel on a batch of the hole pixels and the resulting estimated depth values may be stored in a memory of the processing system 6 while another batch of the hole pixels undergoes the hole-filling procedure. When all the hole pixels of the region of interest have undergone the hole-filling procedure and their corresponding estimated depth values have been determined, the updated depth map is produced from the stored estimated depth values, at act 412. Non-hole pixels of the depth map retain their depth values in the updated depth map, and hole pixels of the depth map are filled with their estimated depth values in the updated depth map. For some of the hole pixels, the estimated depth value may be such that these hole pixels remain hole pixels in the updated depth map. For example, a large hole may comprise many hole pixels of the depth map, such that a hole pixel in the middle of the large hole may be surrounded by neighboring pixels that also are hole pixels. In some cases, the hole pixel of the depth map may be separated from a nearest non-hole pixel by several hole pixels. Depending on the size of a processing kernel for processing hole pixels, discussed below, a hole pixel at or near the middle of a large hole may be filled with an estimated depth value that may be unreliable and therefore may remain a hole pixel in the updated depth map. In such cases, the updated depth map may undergo further hole-filling processing.

More specifically, the depth map may be a raw depth map or may be a previous depth map that is to be subjected to another iteration of hole filling. When a raw depth map is subjected to multiple iterations of hole filling, each iteration yields a depth map in which hole pixels are filled relative to a previous depth map, resulting in fewer holes and/or smaller holes. Relatively smaller holes of a depth map may be completely filled in a single iteration of hole filling whereas relatively larger holes may decrease in size with each iteration of hole filling and may require more than one iteration to be fully filled.

At act 414, the updated depth map is evaluated to determine whether one or more holes remain in the region of interest, similar to the evaluation done at act 404. If no holes are present in the region of interest, the updated depth map is outputted at act 416. If remaining holes are present, the process 400 loops back to act 408, where the hole-filling procedure is performed again on the hole pixels of the remaining holes. Such looping results in the updated depth map being further updated to fill some or all of the hole pixels of the remaining holes. The looping may continue until all the remaining holes are filled, i.e., until there are no hole pixels in the region of interest in the final updated depth map, or until a predetermined maximum number of loops back to act 408 have been performed. At act 416, the updated depth map may be outputted by the hole-filling module 6C to the stereo-data processing module 6A, which in turn may output the updated depth map to the main system controller 30 of the car 10. Alternatively, at act 416, the updated depth map may be outputted by the hole-filling module 6C directly to the main system controller 30 of the car 10.

FIG. 5A schematically shows an example of an initial (raw) depth map 500 comprising a 15×15 array of pixels. The depth map 500 may be produced from pixel disparities between a right image captured by the right camera sensor 2A and a left image captured by the left camera sensor 2B. The pixels of the depth map 500 may correspond directly to the pixels of the right image or the left image. In the depth map 500, each pixel for which a depth may be determined from the right and left images has a numerical depth value shown. For example, each depth value may represent a distance in meters to the portion of the scene in the images corresponding to the pixel. The depth map 500 comprises a plurality of holes 502, 504, 506, 510, 512, 514, of which the holes 502, 504, 506 are small-sized holes each comprising a single pixel, the holes 510, 512 are medium-sized holes each comprising more than one pixel and less than seven pixels, and the hole 514 is a large-sized hole comprising at least 7 pixels. The pixels of the holes 502, 504, 506, 510, 512, 514 ("hole pixels") are shown as black boxes and do not have depth values that can be determined from the right and left images.

Figure 5B:
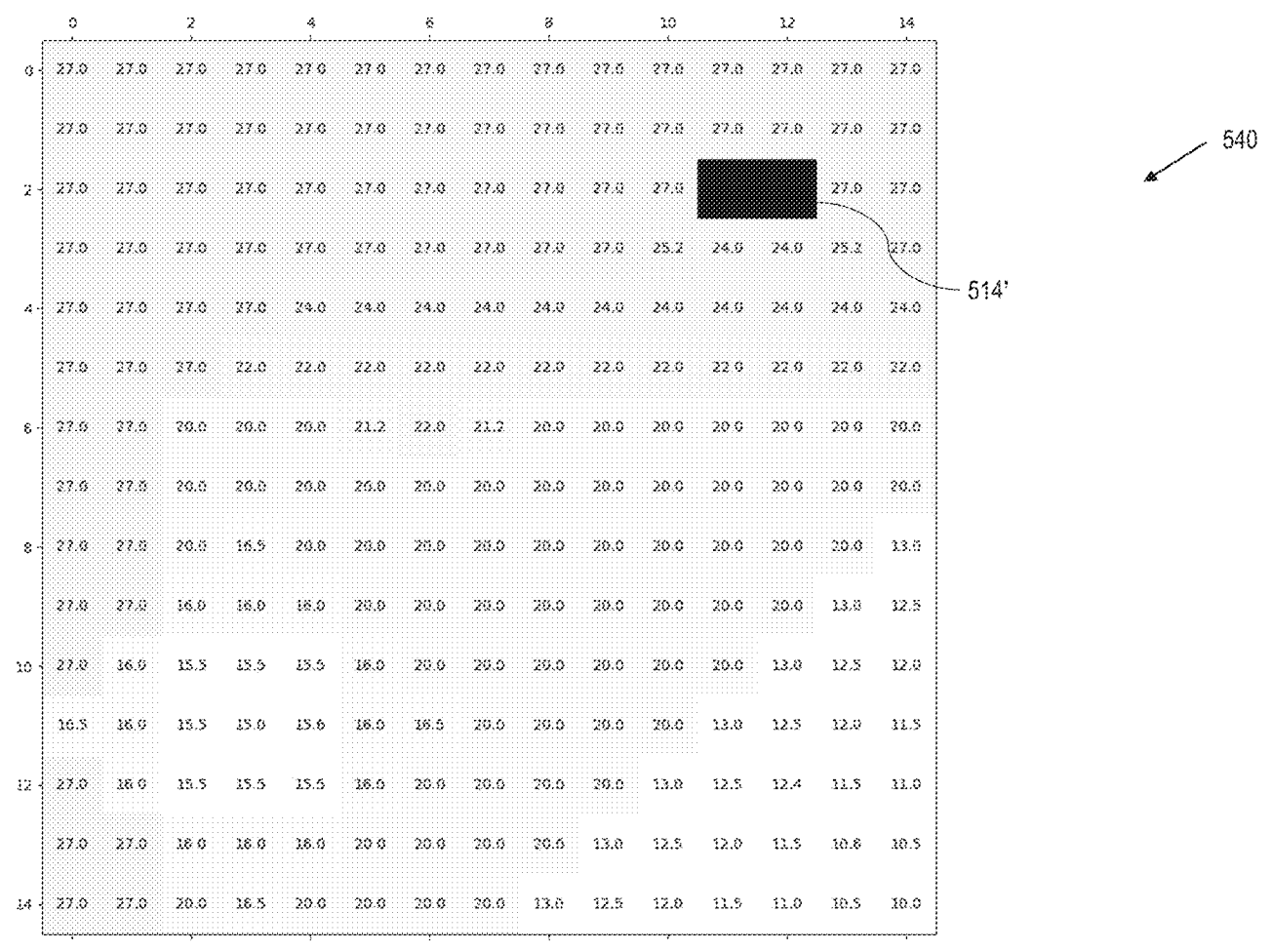

FIG. 5B schematically shows an example of an updated depth map 540 corresponding to the depth map 500 of FIG. 5A after the depth map 500 has been processed with an iteration of hole filling, according to various embodiments of the present technology. A comparison of the updated depth map 540 with the depth map 500 reveals that the small-sized holes 502, 504, 506 and the medium-sized holes 510, 512 have been filled, such that their pixels have estimated depth values in the updated depth map 540, and also reveals that the large-sized hole 514 has been partially filled and is a medium-sized hole 514' in the updated depth map 540. That is, some of the hole pixels of the large-sized hole 514 have been filled such that they have estimated depth values in the updated depth map 540.

Figure 5C:
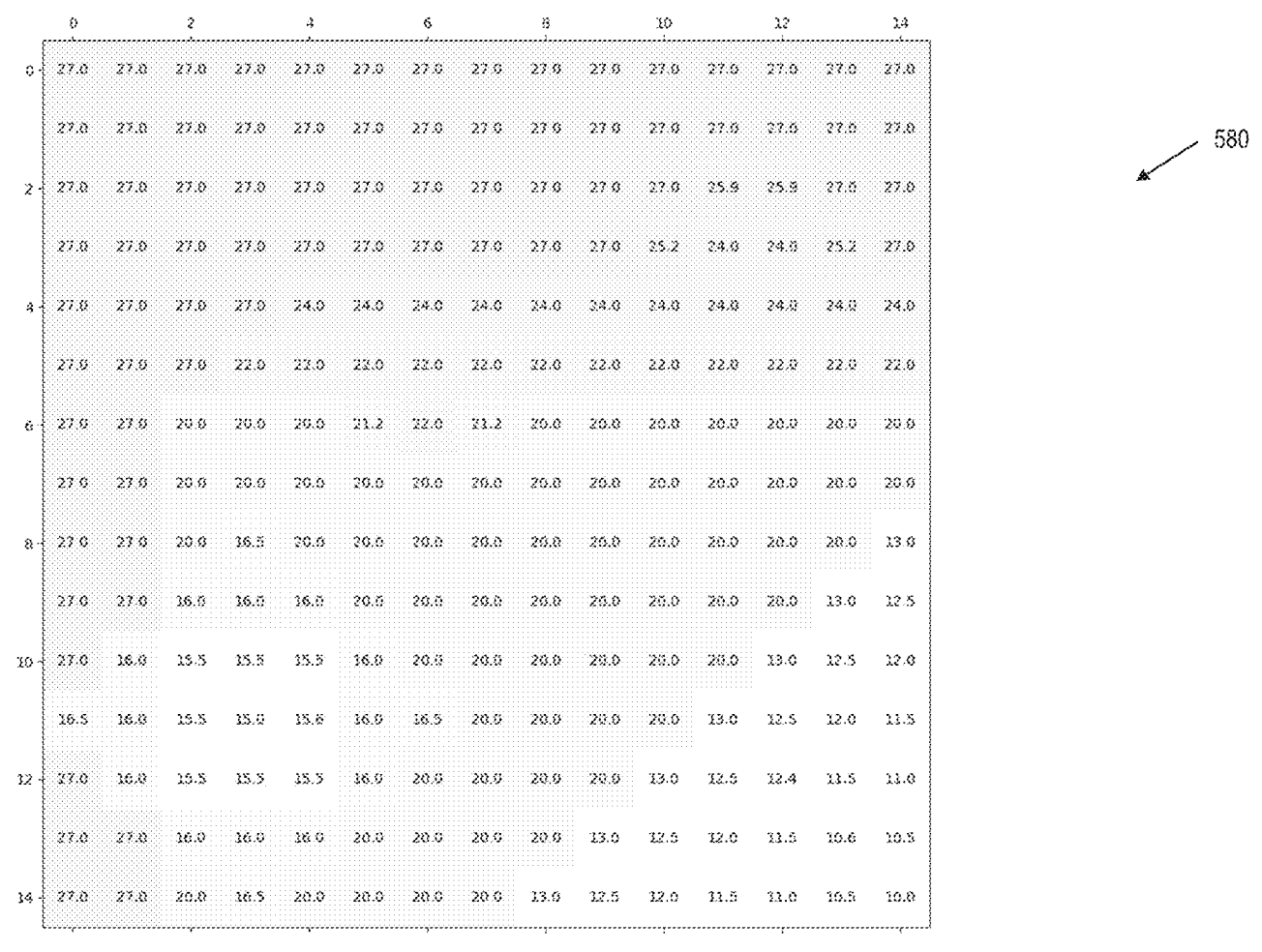

FIG. 5C schematically shows an example of a further updated depth map 580 corresponding to the updated depth map 540 of FIG. 5B after the updated depth map 540 has been processed with an iteration of hole filling, according to various embodiments of the present technology. That is, the further updated depth map 580 corresponds to the depth map 500 after the depth map 500 has undergone two iterations of hole filling. As can be seen in FIG. 5C, all the pixels of the further updated depth map 580 have depth values, each calculated from the original right and left images or estimated from the round(s) of hole filling.

Figure 6:
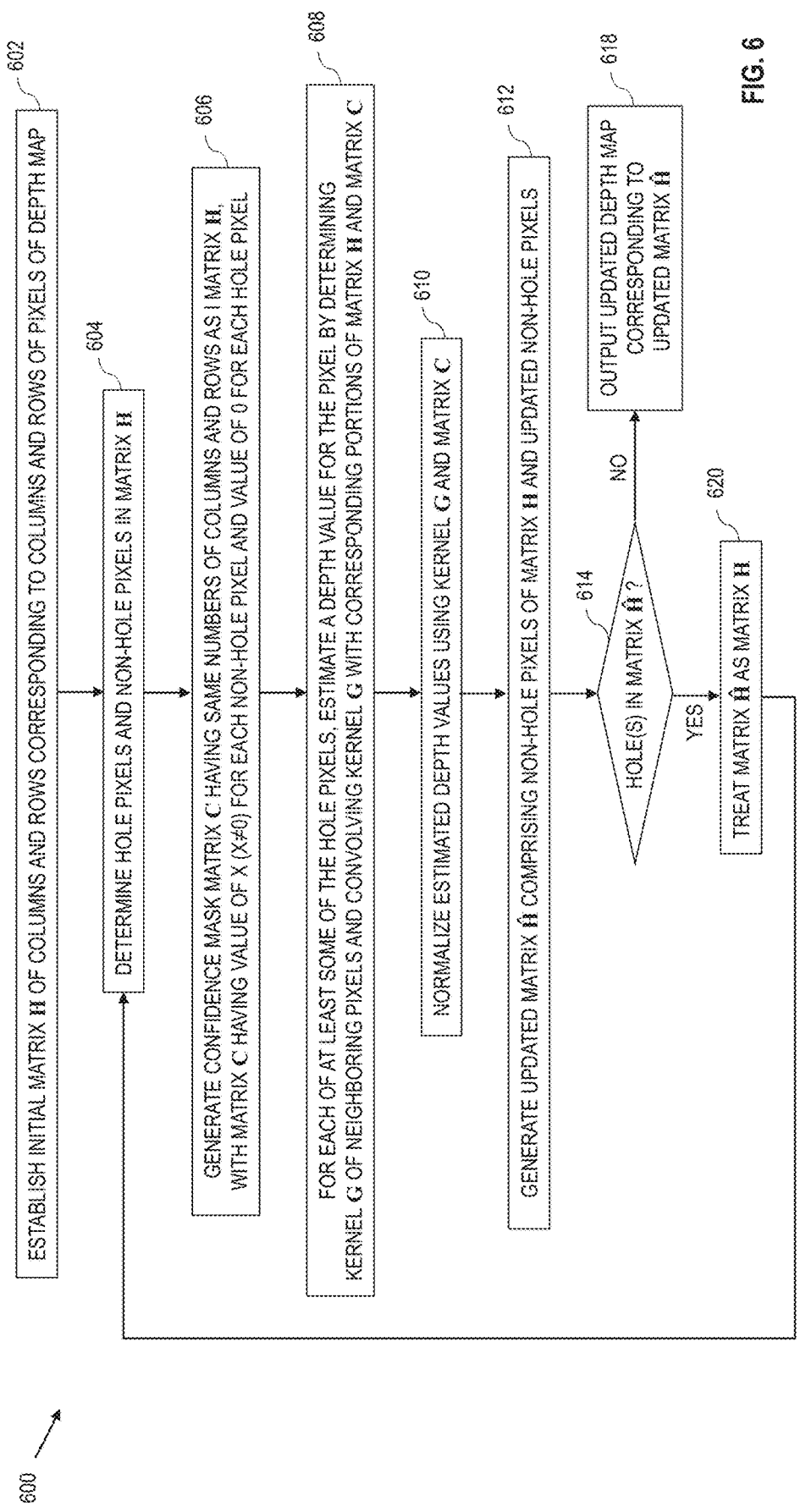
FIG. 6 shows a flow diagram of a hole-filling process, according to some embodiments of the present technology.

FIG. 6 shows a flow diagram of a hole-filling process 600, according to some embodiments of the present technology. The process 600 may be performed by the hole-filling module 6C of the computer processing system 6. At act 602, an initial matrix H is established for a depth map corresponding to a scene captured in a pair of stereo images (e.g., right and left images). For a depth map having a M×N array of pixels, where M is a number of rows of the array and N is a number of columns of the array, the matrix H may be a M×N matrix having M rows and N columns. That is, the matrix H may have the same size as the depth map. Elements of the matrix H may be referred to as pixels having indices or coordinates (i, j), where i is the row number in the matrix H and j is the column number in the matrix H. Thus, a set I of all indices or coordinates of the matrix H may be denoted by expression (2):

$$I=\{(i,j)|1\leq i\leq M, 1\leq j\leq N\}. \quad (2)$$

The depth map may comprise one or more holes comprising hole pixels, i.e., pixels for which depth values cannot be determined reliably from image data of the pair of stereo images. A remainder of the depth map may comprise pixels for which depth values have been determined from the image data. For example, the depth map may be analogous to the depth maps 500, 540 shown in FIGS. 5A and 5B.

Each pixel of the matrix H has a depth value $h_{ij}$ that represents a portion of the scene in the left (or right) image corresponding to the pixel. At act 604, hole pixels and non-hole pixels of the matrix H are determined. According to some embodiments of the present technology, the non-hole pixels, i.e., the pixels that have depth values determined from the right and left images without undergoing hole filling, may form a set F according to expression (3):

$$F\{(i,j)\in I|h_{ij}<\infty\}. \quad (3)$$

Thus, the hole pixels, i.e., the pixels to be filled with estimated depth values, may form a set F'.

At act 606, a confidence mask matrix C having M columns and N rows, i.e., the same dimensions as the matrix H, is generated. Each pixel of the matrix C may have a confidence value $c_{ij}$ determined according to whether a corresponding pixel in the matrix H is a non-hole pixel or a hole pixel. According to some embodiments of the present technology, each non-hole pixel may have a non-zero predetermined value of X and each hole pixel may have a value of zero. In some embodiments, the predetermined value X may be 1.0. Thus, in some embodiments, the values of the matrix C may be determined according to expression (4):

$$c_{ij} = \begin{cases} 1.0 \text{ if } (i,j) \in F \text{ and} \\ 0.0 \text{ if } (i,j) \in F'. \end{cases} \quad (4)$$

Alternatively, in some embodiments, instead of binary values, the matrix C may have a distribution of confidence values determined according to locations of the hole pixels.

At act 608, some or all of the hole pixels undergo a hole-filling procedure in which depth values are estimated. According to some embodiments of the present technology, all of the hole pixels of the depth map may undergo the hole-filling procedure. According to some other embodiments, all of the hole pixels except hole pixels within n rows and n columns of the outer periphery of the depth map may undergo the hole-filling procedure, where n is a number in a range of 1 through 20 (e.g., 5 or 10 or 15). That is, a region of interest may exclude the outer n rows and n columns from consideration. For example, in cases where n=1, hole pixels in the left and right outer columns and/or in the top and bottom outer rows may not undergo the hole-filling procedure but may remain hole pixels. In FIG. 5A, if n=1, hole pixels in any of the rows and columns designated "0" and "14" would not undergo the hole-filling procedure. According to some embodiments, hole pixels in a section of the depth map may undergo the hole-filling procedure. For example, the section may be a quadrant of the depth map or may comprise rows in a central portion of the depth map. As will be appreciated, the section may have any shape and/or may comprise more than one contiguous or non-contiguous regions.

According to some embodiments of the present technology, the hole-filling procedure operates individually on each hole pixel to be filled. In some embodiments, a kernel G may be defined for the hole pixel and may correspond to a window of pixels from which information is pooled to estimate a depth value for the hole pixel. In some embodiments, the kernel G may comprise neighboring pixels adjacent or near the hole-pixel's location. In some embodiments, the kernel G may be a 2D square kernel and have a size of $(2K+1)^2$ pixels, where K is a natural number greater than 0. That is, each side of the square kernel may have $(2K+1)$ pixels. In some embodiments, K may be in a range of 1 through 30 (e.g., 5, 10, 15, 20, 25). In some embodiments, instead of a square kernel, the kernel G may be a 2D rectangular window of pixels having a dimension of $(2K+1)$ on one side and $(2K+k)$ on another side, where k is an odd number other than 1. In some embodiments, a set F of indices (p, q) for the kernel G may be denoted by expression (5):

$$\Gamma=\{(p,q)|-K\leq p\leq K,-K\leq q\leq K\}. \quad (5)$$

The kernel G may be considered to correspond to a weighted average based on each neighboring pixel's weight. A relatively smaller K value may entail fewer computations to fill a hole pixel than a larger K value. However, a relatively smaller K value may require more than one iteration of the hole-filling procedure to fill medium-sized or large-sized holes. In some embodiments, such flexibility in choosing the size the kernel G to be any non-negative kernel matrix may allow a user to regulate a balance between smoothness of a resulting hole-filled depth map, which is associated with relatively larger kernel sizes, and sharpness of a resulting hole-filled depth map, which is associated with relatively smaller kernel sizes. For each hole pixel (i, j) to be filled in the depth map, depth information of neighbors of the hole pixel may be pooled by convolving the kernel G with a portion of the matrix H corresponding to the kernel G and a portion of the matrix C corresponding to the kernel G, to generate an estimated depth value $\hat{h}_{ij}$ according to expression (6):

$$\hat{h}_{ij} = \sum_{p=-K}^{K}\sum_{q=-K}^{K} H(i-p, j-q)C(i-p, j-q)G(K-p, K-q). \quad (6)$$

Some conventional hole-filling techniques may use a Gaussian filter in which a kernel having a Gaussian distribution is used for filtering. With such an approach, a depth value is estimated based on filtering of contributions of neighboring pixels of a hole pixel based on a Gaussian curve. As will be appreciated, Gaussian filtering may entail weighting of the neighboring pixels such that a pixel's weight decays exponentially as a function of spatial distance from a center pixel. FIG. 7A schematically depicts a bell-shaped curve, typical of a one-dimensional Gaussian distribution, and a one-dimensional kernel of pixels under the curve. There are nine pixels in the kernel, including five hole pixels H1, H2, H3, H4, H5 and four non-hole pixels P1, P2, P3, P4. The bell-shaped curve is centered on a hole pixel H1 bordering a non-hole pixel P1. Being at the center of the Gaussian curve, the hole pixel H1 is the one undergoing processing to be filled. The arrow above each of the pixels points to a portion of the curve from which a weight is assigned to the pixel. As can be seen by the arrows in FIG. 7A, a peak of the bell-shaped curve is centered on the hole pixel H1, which is assigned a largest weight and which is taken into consideration in some conventional hole-filling techniques. Each of the other hole pixels H2, H3, H4, H5 also are assigned weights corresponding to their respective positions and these pixels also are taken into consideration. The inventors have recognized and appreciated that conventional filtering using such a typical Gaussian kernel may be associated with a bias towards nearby pixels that are relatively close to the center of the bell-shaped curve, even when the nearby pixels are hole pixels. Moreover, the inventors have recognized and appreciated that, depending on the size of the Gaussian kernel and the size of the hole, this bias may extend to weighting and consideration of hole pixels that are two or more pixels away from the center of the bell-shaped curve. Although not wishing to be bound by theory, it is believed that such conventional Gaussian-based filtering unnecessarily considers hole pixels that are nearby a hole pixel being filled, and may lead to blurring or reduced sharpness of estimated depth values for hole pixels at an edge of an object in the stereo images. Such blurriness or reduced sharpness may manifest as an overestimation of the size of an object.

Figure 7B:
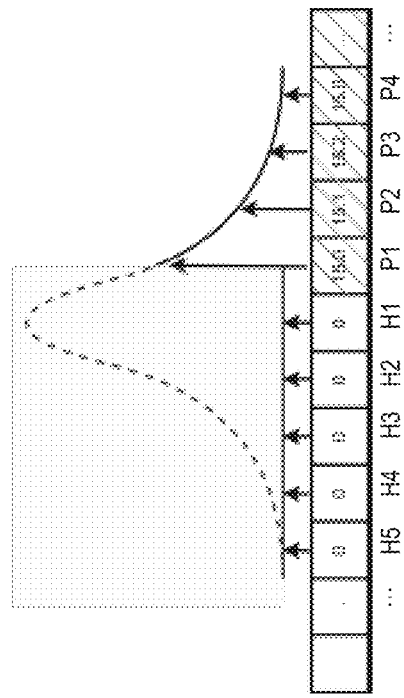
FIG. 7B schematically illustrates a modified Gaussian curve applied to filter a one-dimensional array of pixels, according to some embodiments of the present technology.
Figure 7A:
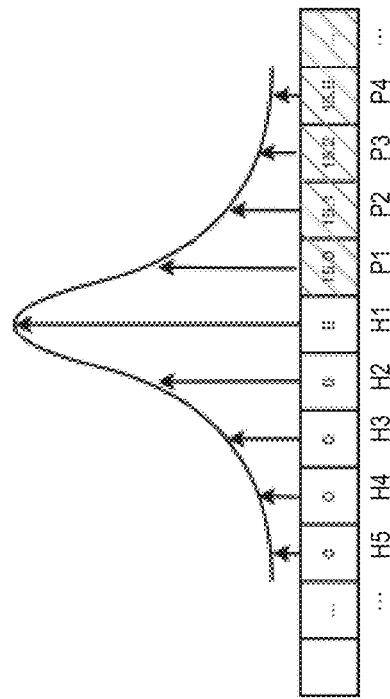
FIG. 7A schematically illustrates a Gaussian curve conventionally applied to filtering a one-dimensional array of pixels under the curve.

FIG. 7B schematically depicts a modified Gaussian curve used to filter a one-dimensional kernel of nine pixels under the curve, according to some embodiments of the present technology. Similar to the kernel of FIG. 7A, the kernel of FIG. 7B includes five hole pixels H1, H2, H3, H4, H5 and four non-hole pixels P1, P2, P3, P4. Unlike the conventional Gaussian approach illustrated in FIG. 7A, the modified Gaussian curve may not take into consideration the hole pixels H1, H2, H3, H4, H5 to estimate a depth value for the hole pixel H1. The hole pixel H1 is at the center of a nine-pixel modified Gaussian curve, which has been modified to assign a weight of zero to the hole pixels H1, H2, H3, H4, H5 while the non-hole pixels P1, P2, P3, P4 are assigned weights typical of a conventional Gaussian curve. In FIG. 7B, the portion of the conventional Gaussian curve corresponding to the hole pixels H1, H2, H3, H4, H5 is shown as a dashed line in the shaded box; the modified Gaussian curve includes only the portion of the conventional Gaussian curve corresponding to the non-hole pixels P1, P2, P3, P4. In contrast to the conventional Gaussian approach, by disregarding the hole pixels, the modified Gaussian approach according to some embodiments of the present technology may result in estimates of depth values that are sharper for hole pixels at or near an edge of an object in the stereo images. Therefore, a depth map in which holes have been filled using the modified Gaussian curve according to various techniques disclosed herein may provide a more accurate estimation of an object's size and depth compared with depth maps in which holes are filled using techniques based on conventional Gaussian curves.

In FIGS. 7A and 7B, the non-hole pixels P1, P2, P3, P4 have the following depth values determined based on stereo images: P1: 15.0 m; P2, 15.1 m; P3: 15.2 m; P4, 15.0 m.

Using a Gaussian filter and a standard deviation of σ=2, a conventional hole-filling technique may yield a depth-value estimate of 5.99 m for the hole pixel H1. In contrast, using a modified Gaussian filter according to some embodiments of the present technology, the hole pixels H1, H2, H3, H4, H5 are not taken into consideration via operation of the confidence mask matrix C, discussed above, yielding an estimated depth value of 15.06 m for the hole pixel H1.

In the scenario of FIGS. 7A and 7B, the hole spans several contiguous pixels: H1, H2, H3, H4, H5. In cases where the hole spans, for example, two hole pixels H1, H2, an estimate of the depth value of the hole pixel H1 using the modified Gaussian filter according to techniques disclosed herein would take into consideration the depth values of all the pixels of the kernel except for the hole pixels H1, H2.

Referring back to FIG. 6, at act 610, the estimated depth values $\hat{h}_{ij}$ may undergo confidence normalization via a weight-normalized confidence mask matrix C, according to some embodiments of the present technology. The matrix $\hat{C}$ may comprise normalized confidence values $\hat{c}_{ij}$ determined according to expression (7):

$$\hat{c}_{ij} = \begin{cases} 1.0 \text{ if } (i, j) \in F \text{ or} \\ \hat{c}_{ij} \text{ if } (i, j) \in F'. \end{cases} \quad (7)$$

In the weight-normalized confidence mask matrix $\hat{C}$, non-hole pixels, i.e., pixels that belong to the set F, retain the confidence value of 1 while hole pixels have normalized confidence values determined based on the kernels G and the matrix C. In some embodiments, the weight-normalized confidence mask matrix $\hat{C}$ may be generated by, for each pixel corresponding to a hole pixel in the matrix H, convolving the kernel G of the hole pixel with the portion of the matrix C corresponding to a hole pixel in the matrix H to generate the normalized confidence value $\hat{c}_{ij}$ according to expression (8):

$$\hat{C}_{ij} = \sum_{p=-K}^{K} \sum_{q=-K}^{K} C(i-p, j-q) G(K-p, K-q). \quad (8)$$

The matrix $\hat{C}$ may be used to obtain normalized estimated depth values $\langle \hat{h}_{ij} \rangle$ according to expression (9):

$$\langle \hat{h}_{ij} \rangle = \frac{\hat{h}_{ij}}{\hat{c}_{ij} + \varepsilon}, \quad (9)$$

where ε is a non-zero constant for avoiding division by zero, should $\hat{c}_{ij}$ equal zero.

Thus, the confidence mask matrix C, which may have binary values, may be used to prepare a scaling-factor matrix $\hat{C}$, which may be used to normalize the estimated depth values determined by the hole-filling procedure of act 608.

At act 612, an update to the matrix H is generated to produce an updated matrix $\hat{H}$ in which the depth values $h_{ij}$ are retained for the non-hole pixels and in which the hole pixels have updated depth values according to expression (6) or, if normalization is desired, normalized updated depth values according to expression (9). That is, elements of the updated matrix $\hat{H}$ may be determined according to expression (10):

$$\hat{h}_{ij} = \begin{cases} h_{ij} \text{ if } (i, j) \in F \text{ or} \\ \hat{h}_{ij} \text{ if } (i, j) \in F', \end{cases} \quad (10)$$

if no confidence normalization is desired. Optionally, if confidence normalization is desired, the elements of the updated matrix $\hat{H}$ may be determined according to expression (11):

$$\hat{h}_{ij} = \begin{cases} h_{ij} \text{ if } (i, j) \in F \text{ or} \\ \langle \hat{h}_{ij} \rangle \text{ if } (i, j) \in F'. \end{cases} \quad (11)$$

For larger-sized holes in the depth map, the hole-filling procedure may successfully fill some but not all of the hole pixels. This may be understood from FIGS. 5A and 5B, which shows the depth map 500 before the hole-filling procedure (FIG. 5A) and the updated depth map 540 after one iteration or round of the hole-filling procedure. A single iteration of the hole-filling procedure on the pixels of the depth map 500 was successful to fill the small-sized holes 502, 504, 506 and the medium-sized holes 510, 512, but the large-sized hole 514 was filled only partially, resulting in the medium-sized hole 514' in the updated depth map 540.

Returning to the hole-filling process 600 of FIG. 6, at act 614, a determination is made as to whether the updated matrix H includes one or more hole pixels in the region of interest. If no hole pixel is present in the region of interest, the process 600 proceeds to act 618, where the updated matrix $\hat{H}$ is outputted as an updated depth map. If one or more holes are present in the region of interest, the process 600 proceeds to act 620, where the updated matrix H takes the place of the matrix $\hat{H}$ and then loops back to act 604 for another iteration of the hole-filling procedure. Continuing with the example of the hole-filling of the depth map 500, FIG. 5C shows the further updated depth map 580 resulting from the depth map 500 undergoing two iterations of hole-filling. That is, the further updated depth map 580 corresponds to the updated depth map 540 of FIG. 5B after another iteration of hole filling, for a total of two rounds of hole-filling.

Optionally, according to some embodiments of the present technology, a non-zero threshold of may be set for determining whether another round of hole-filling is to be performed. For example, at act 614, if it is determined that there are a holes or fewer having a size of b pixels or fewer, then no further hole-filling is to be performed and the process 600 may proceed act 618, where a may be 25 or 20, or 15 or 10 or 5 or 2, and b may be 5 or 4 or 3 or 2 or 1.

Also optionally, according to some embodiments of the present technology, a maximum number of loops may be performed after which a final updated depth map may be outputted. For example, at act 614, ever in it is determined that there are holes remaining in a current updated depth map, if a number of iterations of the hole-filling procedure that has already been performed has reached a maximum number (e.g., 5 or 10 or 15 or 20), the process 600 may proceed to act 618 at which point the current updated depth map is outputted, even if all the hole pixels have not been filled.

The hole-filling techniques disclosed herein may yield a depth map that preserves boundaries at edges of object in a scene captured in the stereo images by taking into consideration, individually for each hole-pixel of interest, the hole pixel's neighboring pixels. Further, parallel processing may be used to increase the speed of the hole-filling process (e.g., the process 600). This may result in hole-filling run times that are at least twice as fast as run times for conventional techniques. Furthermore, some or all of the process 600 may be performed using a GPU (e.g., GeForce™, Nvidia, Santa Clara, CA, USA), which may further increase processing speeds of some computations of the process 600 by three times or five times or even eight times or more over conventional processing speeds.

For example, act 608 may be performed for groups of hole-pixels in parallel using a GPU such that high-resolution images of at least 5 MP may undergo hole-filling in real time or nearly real time. This may result in more robust hole-filling of high-resolution stereo images in real time or nearly real time than what is possible conventional hole-filling techniques. Such a speed increase may be used advantageously to output updated depth maps to a main controller (e.g., the system controller 30) and/or an ECU (e.g., the ECU 34-1) of a vehicle in real time or nearly real time, thus permitting safer operation of vehicle, which may rely on the updated depth maps for automated control operations while the vehicle is traveling at high speeds (e.g., typical highway speed limits), as discussed above.

Experimental Results

FIGS. 8A through 8C, FIGS. 9A through 9C, FIGS. 10A through 10C, and FIGS. 11A through 11C show four sets of hole-filling experiments utilizing a hole-filling technique according to an embodiment of the technology disclosed herein. The experiments were performed on four stereo pairs of color images. FIGS. 8A, 9A, 10A, and 11A respectively show one color image of the stereo pairs for the four sets of experiments. The images were obtained by camera sensors of a NODAR Hammerhead™ 3D vision system (NODAR, Somerville, MA, USA) mounted on a car and captured while the car was in motion. The camera sensors were separated by a baseline of 1.2 m and each captured a 5-MP image comprising 1860 pixels×2880 pixels.

FIGS. 8B, 9B, 10B, and 11B respectively show raw depth maps obtained from the stereo pairs of images, which are depth maps that have not undergone any hole-filling. Each raw depth map was generated by performing stereo-matching on corresponding pairs of pixels of the left and right images of the stereo pair and determining a pixel shift or disparity corresponding to each pair of pixels. As discussed above in connection with expression (1), the disparity of a pair of pixels may be used to calculate the depth at a site corresponding to the pair of pixels. Regions that are black in the raw depth maps are regions where depth information is missing. That is, black regions in the raw depth maps correspond to holes. Relative brightness in the raw depth maps indicates relative distance or depth. Regions that are relatively brighter are regions that are relatively closer to the car. Regions that are relatively darker are regions that are relatively farther from the car.

FIGS. 8C, 9C, 10C, and 11C respectively show hole-filled depth maps obtained by filling the holes in the raw depth maps of FIGS. 8B, 9B, 10B, and 11B. That is, hole pixels of the holes are filled by performing hole-filling techniques disclosed herein, using a $\sigma=(5, 2)$ modified Gaussian kernel G having a kernel size of 121 pixels (i.e., for a square kernel of K=5, an 11×11 square of 121 pixels) and a standard deviation of 2 in the vertical direction and 5 in the horizontal direction. Ten iterations of hole-filling were performed to fill as many of the hole pixels as possible, with each iteration reducing the number of hole pixels. As can be seen from the hole-filled depth maps of FIGS. 8C, 9C, 10C, and 11C compared to the raw depth maps of FIGS. 8B, 9B, 10B, and 11B, the number of holes has decreased dramatically, especially in a central portion of the hole-filled depth maps. Also evident from a comparison of the color images of FIGS. 8A, 9A, 10A, and 11A, the raw depth maps of FIGS. 8B, 9B, 10B, and 11B, and the hole-filled depth maps of FIGS. 8C, 9C, 10C, and 11C is that, for each set of experiments, the portion of the raw depth map corresponding to the road surface of the two-lane road in the color image shows numerous holes whereas, in contrast, the same portion in the hole-filled depth map shows no holes at all. Also evident from the four sets of experiments is that the raw depth maps have several regions where there are discontinuities or abrupt changes in brightness whereas the hole-filled depth maps show gradual changes in brightness with no discontinuities. For comparison, FIGS. 8D, 9D, 10D, and 11D show conventional hole-filled depth maps corresponding to the images of FIGS. 8A, 9A, 10A, and 11A, respectively.

Figure 8A:
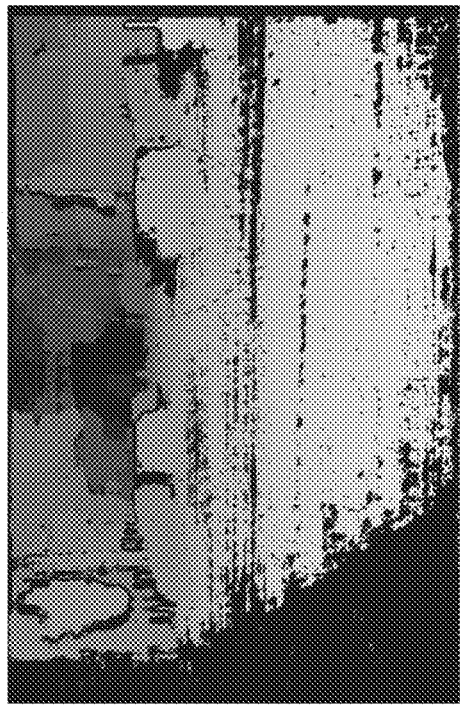
FIGS. 8A, 8B, and 8C show, respectively, a first image, a raw depth map for the first image, and a hole-filled depth map for the first image resulting from processing according to a technique disclosed herein.
Figure 8B:
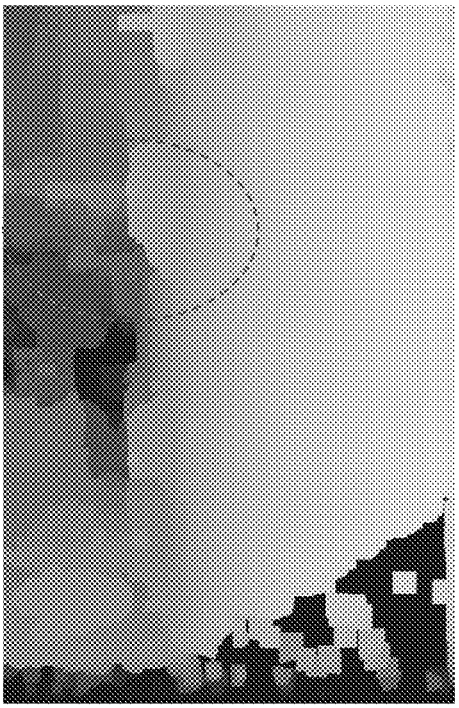
Figure 8C:
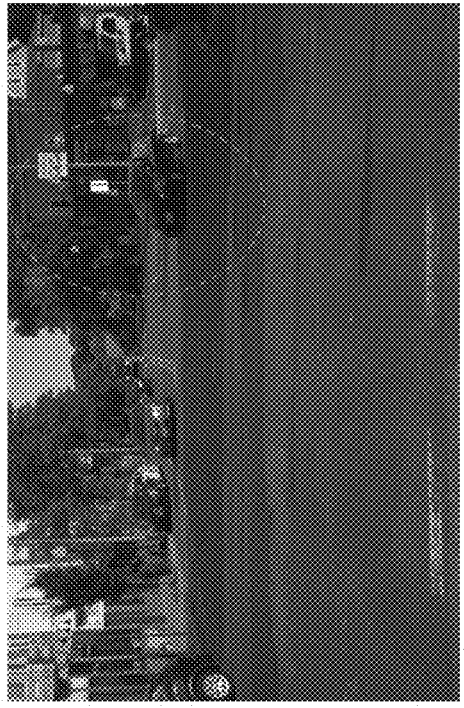

With respect to the first set of experiments, see the regions in the dashed circles in FIGS. 8A, 8B, and 8C. In FIG. 8A, the portion of the image in the dashed circle shows a car in front of a tall signpost relatively closer to the car and a short signpost relatively farther from the car, i.e., objects overlapping or layered on other objects. In the raw depth map of FIG. 8B, the same portion shows abrupt discontinuities at edges or borders of the objects, where the edges or borders are black, indicating holes or a distances that are beyond the range that may be calculated by the vision system (e.g., see the continuous black edge region above the car and the continuous black edge region to the left of the taller signpost). In actuality, however, it is known from the image that in FIG. 8A that the discontinuities in the raw depth map are artifacts, because in the image the transition from one object to another object does not include a region where the distance is so large that it would give rise to a line of black pixels. Moreover, the continuous edge regions of black pixels are unlikely the result of random hole pixels, because the black pixels are not random but appear to follow contours in the image. The artifacts are sometimes referred to as "stereo-shadows" by those working with computer-vision technology and are believed to be areas that are "seen" or imaged by one camera but occluded or not imaged by the other camera. In the hole-filled depth map of FIG. 8C, which resulted from the raw depth map of FIG. 8B having undergone hole-filling according to the techniques disclosed herein, the object edges or borders where one object overlaps another object transition relatively smoothly from one brightness to another brightness, which is a more realistic indication of depth values for the portion of the image in the dashed circle in FIG. 8A. Also, in the hole-filled depth map of FIG. 8C, the continuous edge region of black pixels to the left of the taller signpost is significantly smaller than in the raw depth map of FIG. 8B. In the hole-filled depth map of FIG. 8C, local information of bordering pixels at the edges of objects are used advantageously to estimate depth values for hole pixels, such that sharp boundaries between objects are preserved.

Figure 8D:
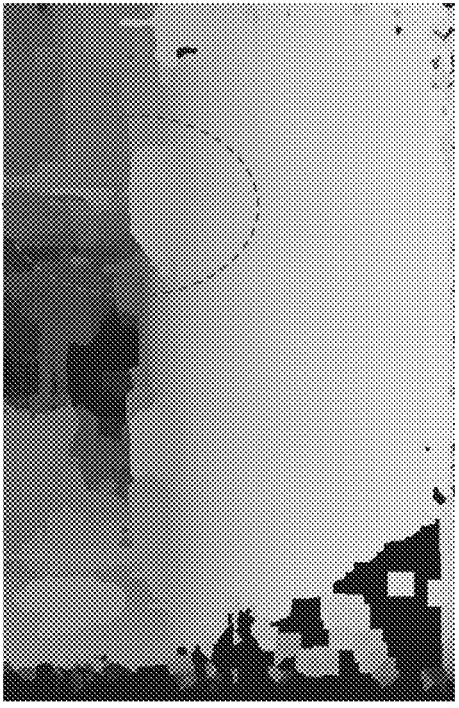
FIG. 8D shows a hole-filled depth map resulting from conventional processing of the raw depth map of FIG. 8B using a bilateral filter.

In comparison, FIG. 8D shows a conventional hole-filled depth map corresponding to the image of FIG. 8A. In FIG. 8D, the holes were filled using an algorithm based on a conventional bilateral filter. As evident from comparing the hole-filled depth map of FIG. 8C, which was obtained using techniques of the present technology, with the conventional hole-filled depth map of FIG. 8D, hole-filling using the bilateral filter resulted in an overestimation of object sizes. For example, in the dashed circle in FIG. 8D, the taller and shorter signposts have merged together into one object, and the width of the taller signpost is more than twice the width of the taller signpost in the hole-filled depth map of FIG. 8C obtained using the present technology. Such widening of the taller signpost is indicative of the overestimation that may occur using the conventional bilateral filter for hole filling. Hole filling using the present technology, in contrast, results in a more accurate estimation of object borders. Furthermore, the conventional depth map in FIG. 8D looks more pixelated compared to the depth map in FIG. 8C, revealing that the depth estimation with the present technology is also more precise. For example, the depth map corresponding to the windshield of the car in FIG. 8D has unusual corners, unlike in FIG. 8C where the edge looks much sharper.

Figure 9A:
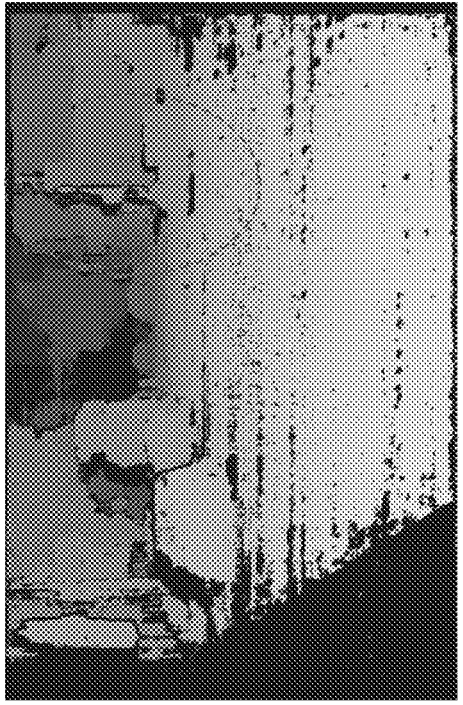
FIGS. 9A, 9B, and 9C show, respectively, a second image, a raw depth map for the second image, and a hole-filled depth map for the second image resulting from processing according to a technique disclosed herein.
Figure 9B:
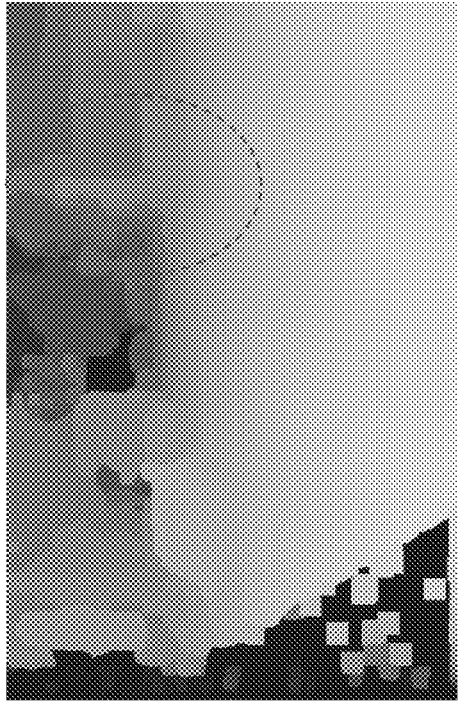
Figure 9C:
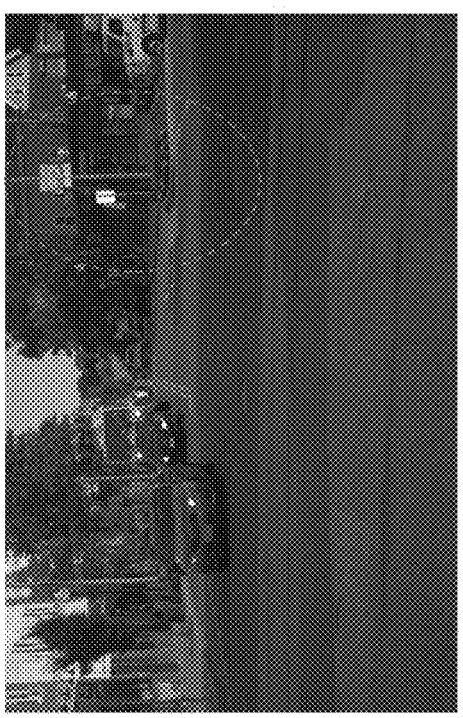
Figure 9D:
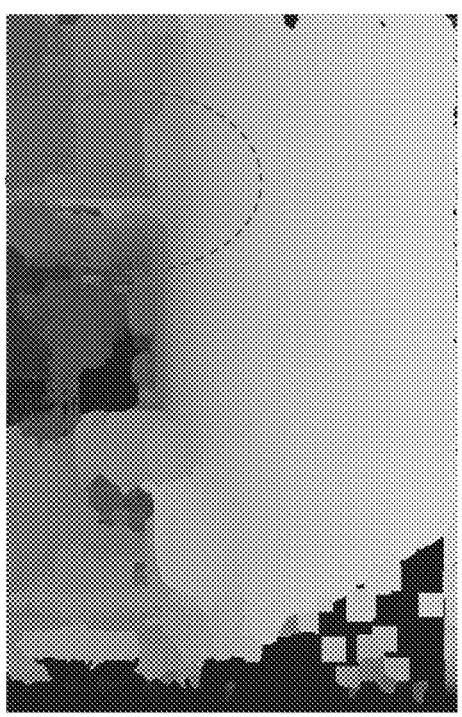
FIG. 9D shows a hole-filled depth map resulting from conventional processing of the raw depth map of FIG. 9B using a bilateral filter.

With respect to the second set of experiments, see the regions in the dashed circles in FIGS. 9A, 9B, and 9C. In FIG. 8A, the portion of the image in the dashed circle shows the same taller and shorter signposts as in FIG. 8A but without the car in front. In the raw depth map of FIG. 9B, the same portion shows stereo-shadows or abrupt discontinuities at edges or borders of the objects, similar to those in FIG. 8B discussed above. In the hole-filled depth map of FIG. 9C, which resulted from the raw depth map of FIG. 9B having undergone hole-filling according to the techniques disclosed herein, objects transition relatively smoothly from one brightness to another brightness, which is a more realistic indication of depth values, and black regions corresponding to holes are either eliminated or significantly reduced in size. In comparison, in the conventional hole-filled depth map of FIG. 9D, which was obtained using a bilateral filter, there is the same overestimation of object sizes as in FIG. 8D discussed above.

Figure 10B:
FIGS. 10A, 10B, and 10C show, respectively, a third image, a raw depth map for the third image, and a hole-filled depth map for the third image resulting from processing according to a technique disclosed herein.
Figure 10D:
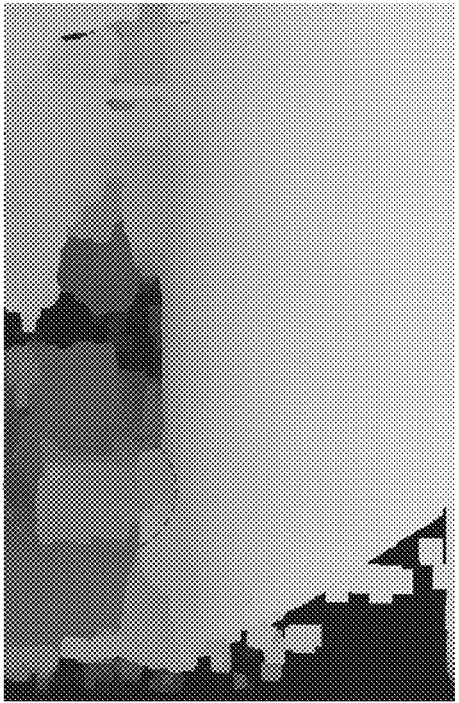
FIG. 10D shows a hole-filled depth map resulting from conventional processing of the raw depth map of FIG. 10B using a bilateral filter.
Figure 10A:
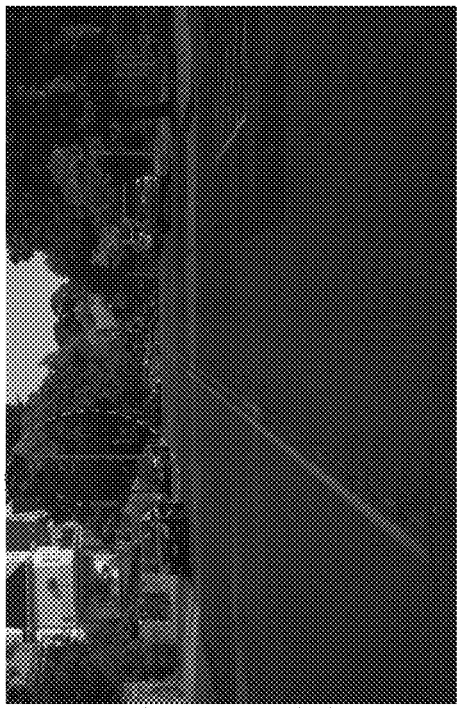
Figure 10C:
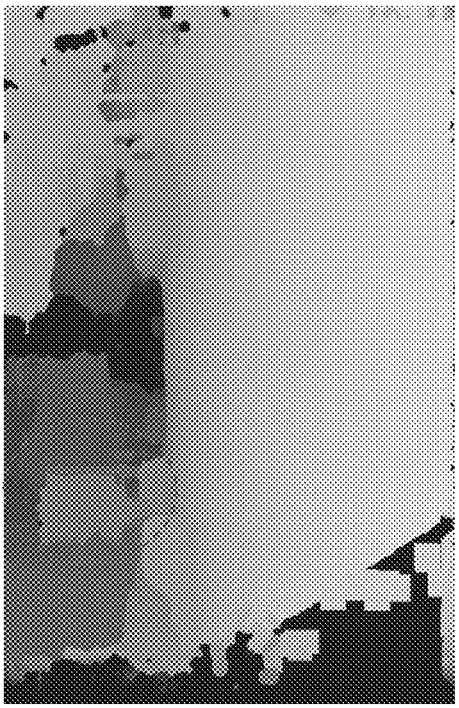

With respect to the third set of experiments, see the regions in the dashed circles in FIGS. 10A, 10B, and 10C. In FIG. 10A, the portion of the image in the dashed circle shows a car in front of a signpost and a tree to the left of the car, i.e., objects layered on and/or in close proximity to other objects. In the raw depth map of FIG. 10B, the same portion shows stereo-shadows or abrupt discontinuities at around the car and at outer edges of the tree. In the hole-filled depth map of FIG. 10C, which resulted from the raw depth map of FIG. 10B having undergone hole-filling according to the techniques disclosed herein, nearly all of the stereo-shadows have been removed, such that objects transition relatively smoothly from one brightness to another brightness. In comparison, FIG. 10D shows a conventional hole-filled depth map corresponding to the image of FIG. 10A, in which the holes have been filled using a bilateral filter. As evident from comparing the hole-filled depth map of FIG. 10C, which was obtained using techniques of the present technology, with the conventional hole-filled depth map of FIG. 10D, hole-filling using bilateral filter resulted in an overestimation of object sizes and a loss of detail around the tree.

Figure 11A:
FIGS. 11A, 11B, and 11C show, respectively, a fourth image, a raw depth map for the fourth image, and a hole-filled depth map for the fourth image resulting from processing according to a technique disclosed herein.
Figure 11B:
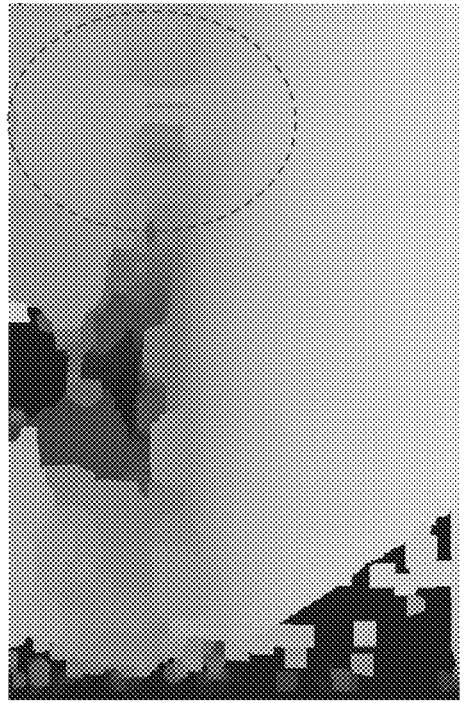
Figure 11C:
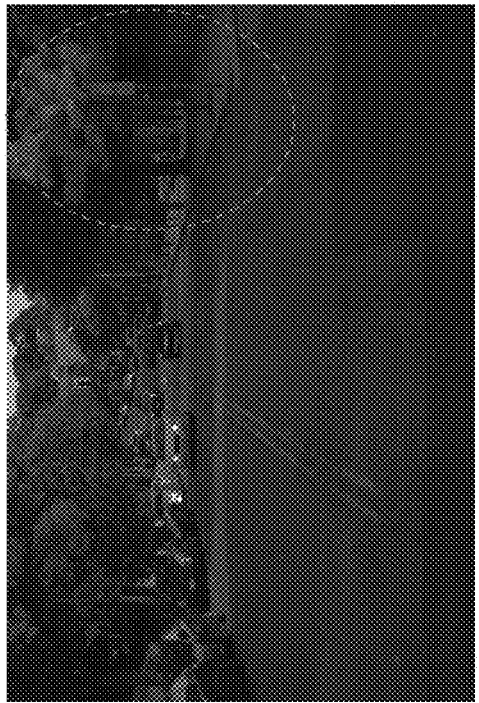
Figure 11D:
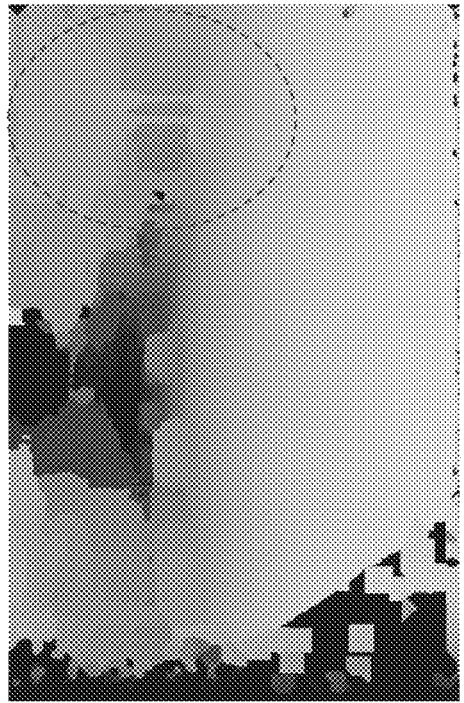
FIG. 11D shows a hole-filled depth map resulting from conventional processing of the raw depth map of FIG. 11B using a bilateral filter.

With respect to the fourth set of experiments, see the regions in the dashed circles in FIGS. 11A, 11B, and 11C. In FIG. 11A, the portion of the image in the dashed circle shows a signpost in front of a tree that is in front of another tree, i.e., objects layered on other objects. In the raw depth map of FIG. 11B, the same portion shows stereo-shadows or abrupt discontinuities at edges or borders between the objects. In the hole-filled depth map of FIG. 11C, which resulted from the raw depth map of FIG. 11B undergoing hole-filling according to the techniques disclosed herein, the object edges or borders where one object overlaps another object transition smoothly from one brightness to another brightness, which is a more realistic indication of depth values for the portion of the image in the dashed circle in FIG. 11A. In comparison, FIG. 11D shows a conventional hole-filled depth map corresponding to the image of FIG. 11A, in which the holes were filled using a bilateral filter. As evident from comparing FIG. 11C with FIG. 11D, hole filling using the conventional bilateral filter resulted in an overestimation of object sizes, a loss of detail, and objects that have been merged together. For example, in the dashed circle in FIG. 11D, vertical bars are present and correspond to the signpost and trees in FIG. 11A. These vertical bars are much wider than corresponding structures in the FIG. 11C and is indicative of the overestimation of the sizes of the signpost and trees. Moreover, the tree on the left part of the dashed circle appears to be more than double the width of the actual tree in FIG. 11A. This is believed to result from the conventional bilateral filter merging objects that are close to each other. A comparison of FIGS. 11A, 11C, and 11D also reveals that the conventional bilateral filter causes vehicles outside of the dashed circle to appear larger. In FIG. 11C, the vehicles appear relatively true to their sizes in FIG. 11A whereas in FIG. 11D the vehicles are noticeably larger.

Results of the four experiments indicate that hole filling using a conventional bilateral filter may not produce 3D information of a scene that is as accurate as hole filling using the techniques of the present technology and, in some cases, may produce misleading 3D information. Hole-filled depth maps produced according to the present technology may provide more detailed information at the edges of objects, which may be used advantageously to identify certain objects (e.g., a stop sign, a road-construction cone, etc.). Moreover, the preservation of sharp boundaries in hole-filled depth maps produced according to the present technology may be used advantageously to estimate depth values more accurately for overlapping or layered objects that are at different distances. In contrast, hole-filling of stereo-shadows using a conventional bilateral filter may result in merging of overlapping objects, which may result in unreliable object identification, since the hole-filled depth map may provide information that is inconsistent with the image corresponding to the hole-filled depth map.

It should be noted that in the four sets of experiments there is a black triangular region at the lower-left corners of the raw depth maps and the hole-filled depth maps. No hole-filling is intended for the triangular regions in the four sets of experiments. These triangular regions are the result of an alignment of the camera sensors used to obtain the pair of stereo images. That is, the left and right images of the stereo pair do not overlap at the triangular region and therefore stereo matching of pixels in that region is not possible.

As noted above, hole-filling techniques disclosed herein may be used to generate hole-filled depth maps in real time or nearly real time. An experiment was conducted to compare processing speeds of a confidence-aware hole-filling ("CAHF") algorithm according to an embodiment of the present technology with that of a conventional algorithm that utilizes a bilateral filter. The experiment quantifies a throughput rate of a single iteration of both algorithms using the same hardware and implemented in Python with OpenCV inbuilt functions. Both algorithms were run on an Intel Core i9-12950HX processor. Additionally, to demonstrate how processing time may be accelerated via parallel processing using a processor designed for processing graphical data, the CAHF algorithm was run on an Nvidia RTX A5500 graphics processor. The experiment was performed for different kernel sizes, and was performed 300 times for each algorithm at each kernel size. TABLE 1 summarizes the results of the experiment.

In TABLE 1, the average throughput rates are shown for kernel sizes of 11, 21, 31, and 51 for 300 hole-filling runs, i.e., for 300 processings of depth maps to fill holes. The results show that performing hole-filling processing with the Intel CPU is nearly twice as fast for the CAHF algorithm of the present technology (23 FPS) compared with the algorithm based on conventional bilateral-filtering technology (12 FPS), for a kernel size of 11 pixels. Note that a minimum speed of 10 FPS is considered to be standard for real-time processing for vision systems. Therefore, for the relatively small kernel size of 11 pixels, the algorithm based on conventional technology meets the real-time standard with little room for delays. It was observed that an increase in kernel size resulted in a linear increase in computation time for the CAHF algorithm of the present technology run on the Intel CPU. The speed for processing a kernel size of 21 pixels using the CAHF algorithm run on the Intel CPU was found to meet the real-time standard of 10 FPS with no room for delays. In contrast, for the algorithm of the conventional bilateral-filtering technology run on the Intel CPU, an increase in kernel size was found to result in a drastic increase in computation time, with a kernel size of 21 pixels resulting in a speed of 6 FPS, i.e., below the speed for the processing to be considered real-time. Thus, it would be impractical to use conventional techniques to fill larger depth-map holes in high-resolution images in a single processing iteration, because real-time processing for kernel sizes much greater than 11 pixel would be challenging if not impossible. It was further observed that use of the Nvidia GPU to run the CAHF algorithm significantly increased the processing efficiency such that processing speeds for kernel sizes of 31 pixels and even 51 pixels were well above the minimum for real-time processing. In fact, the processing speed of 42 FPS for a kernel size of 51 pixels using the GPU was found to be faster than the processing speed of 23 FPS for a kernel size of 11 pixels using the CPU, indicating that real-time processing of depth maps to fill larger holes may be realistic by running the CAHF algorithm on a GPU.

TABLE I

Comparison of average throughput rates of (A) bilateral-filter algorithm run on Intel Core i9-12950HX CPU; (B) CAHF algorithm run on Intel Core i9-12950HX CPU; and (C) CAHF algorithm run on Nvidia RTX A5500 GPU.

| Kernel Size (# pixels) | CPU Runtime - CAHF; Speed | CPU Runtime - Bilateral Filter; Speed | GPU Runtime - CAHF; Speed |
| --- | --- | --- | --- |
| 11 | 0.0434 s; 23 FPS | 0.0810 s; 12 FPS | 0.0186 s; 54 FPS |
| 21 | 0.0976 s; 10 FPS | 0.1681 s; 6 FPS | 0.0189 s; 53 FPS |
| 31 | 0.1220 s; 8 FPS | 1.7411 s; 0.6 FPS | 0.0193 s; 52 FPS |
| 51 | 0.1794 s; 5 FPS | 4.6947 s; 0.2 FPS | 0.0235 s; 42 FPS |

Methods of repairing holes in 3D images according to the technology described herein may comprise various processes, examples of which include processes (1) through (29), as follows:

(1) A method of repairing a 3D image generated by a vision system on a vehicle, the method comprising: (a) obtaining a three-dimensional (3D) image of a scene, the 3D image corresponding to a depth map of the scene generated from at least one two-dimensional (2D) image captured of the scene, wherein: the 3D image comprises a plurality of pixels arranged in a matrix H, and the pixels comprise first pixels and second pixels, each of the first pixels having a first pixel value corresponding to a depth value for a portion of the scene represented by the first pixel, and each of the second pixels corresponding to a hole having an unknown depth value for a portion of the scene represented by the second pixel; (b) determining a confidence mask matrix C for the 3D image; (c) for each of at least some of the second pixels: determining a kernel G of neighboring pixels of the second pixel, the neighboring pixels of the kernel G having values corresponding to a predetermined distribution, and convolving the kernel G with a portion of the confidence mask matrix C and a portion of the matrix H corresponding to the kernel G to obtain an estimated depth value for the second pixel; (d) generating a corrected matrix $\hat{H}$ representing a corrected 3D image, the corrected matrix $\hat{H}$ comprising the first pixels and corrected second pixels, wherein the corrected second pixels correspond to the second pixels corrected to have second pixel values corresponding to the estimated depth values; and outputting data corresponding to at least a portion of the corrected matrix $\hat{H}$ to the vehicle, wherein a total number of holes in the matrix H is greater than a total number of holes in the corrected matrix $\hat{H}$.

(2) The method of process (1), wherein the outputting occurs in real time or nearly real time to a time when the at least one 2D image is captured of the scene.

(3) The method of process (1) or process (2), wherein, when the kernel G of the second pixel comprises none of the first pixels, the second pixel remains a hole in the corrected matrix $\hat{H}$.

(4) The method of any one of process (1) through process (3), wherein the corrected 3D image comprises: at least some of the first pixels of the 3D image, and at least some of the corrected second pixels.

(5) The method of any one of process (1) through process (4), wherein the outputting outputs data corresponding to at least a portion of the corrected matrix $\hat{H}$ to at least one electronic control unit (ECU) of the vehicle.

(6) The method of any one of process (1) through process (5), wherein the outputting outputs data corresponding to at least a portion of the corrected matrix $\hat{H}$ to a computer controller of the vehicle.

(7) The method of any one of process (1) through process (6), wherein the outputting outputs data corresponding to at least a portion of the corrected matrix $\hat{H}$ to a display monitor of the automobile.

(8) The method of any one of process (1) through process (7), wherein the outputting outputs data corresponding to some or all of the corrected 3D image to a display of the automobile.

(9) The method of any one of process (1) through process (8), wherein the outputting outputs data corresponding to at least a portion of the corrected matrix $\hat{H}$ to a transmitter of the vehicle for transmission to a computer external to the vehicle.

(10) The method of any one of process (1) through process (9), wherein the computer external to the vehicle is a computer of a second vehicle.

(11) The method of any one of process (1) through process (10), wherein the vehicle is a first moving vehicle and the second vehicle is a second moving vehicle.

(12) The method of any one of process (1) through process (11), wherein the outputting occurs within 1 second of when the at least one 2D image is captured of the scene.

(13) The method of any one of process (1) through process (12), wherein the outputting occurs within 0.1 sec of when the at least one 2D image is captured of the scene.

(14) The method of any one of process (1) through process (13), wherein the outputting occurs within 0.01 second when the at least one 2D image is captured of the scene.

(15) The method of any one of process (1) through process (14), wherein the outputting occurs within 1 millisecond of when the at least one 2D image is captured of the scene.

(16) The method of any one of process (1) through process (15), wherein the 3D image of the scene is part of a real-time video stream obtained from a vision system on the vehicle.

(17) The method of any one of process (1) through process (16), further comprising: repeating (a) through (d) using the corrected 3D image as the 3D image of the scene.

(18) The method of any one of process (1) through process (17), wherein: the confidence mask matrix C and the matrix H have a same size, elements of the confidence mask matrix C corresponding to the first pixels have a first value, and elements of the confidence mask matrix C corresponding to the second pixels have a second value different from the first value.

(19) The method of any one of process (1) through process (18), wherein the first value is 1.

(20) The method of any one of process (1) through process (19), wherein the second value is 0.

(21) The method of any one of process (1) through process (20), wherein: each of the confidence mask matrix C, the matrix H, and the corrected matrix $\hat{H}$ comprises M rows and N columns such that a set I of indices for the confidence mask matrix C, the matrix H, and the corrected matrix $\hat{H}$ is given by:

$$I=\{(i,j)|1\leq i\leq M, 1\leq j\leq N\},$$

and elements $c_{ij}$ of the confidence mask matrix C have values given by:

$$c_{ij} = \begin{cases} 1, & \text{if } (i, j) \text{ is for one of the first pixels} \\ 0, & \text{if } (i, j) \text{ is for one of the second pixels.} \end{cases}$$

(22) The method of any one of process (1) through process (21), wherein, in (c), the determining of the kernel G of neighboring pixels determines the kernel G to have a size of 2K+1, where K is a natural number greater than 0.

(23) The method of any one of process (1) through process (22), wherein the natural number is in a range of 1 to 30.

(24) The method of any one of process (1) through process (23), wherein the natural number is in a range of 3 to 15.

(25) The method of any one of process (1) through process (24), wherein the kernel G is a square kernel.

(26) The method of any one of process (1) through process (25), wherein: the corrected second pixels of the corrected matrix $\hat{H}$ have values corresponding to the estimated depth values for the second pixels, and elements $\hat{h}_{ij}$ of the corrected matrix $\hat{H}$ corresponding to the corrected second pixels have values given by:

$$\hat{h}_{ij} = \sum_{p=-K}^{K}\sum_{q=-K}^{K} H(i-p, j-q)C(i-p, j-q)G(K-p, K-q),$$

where a set Γ of indices (p, q) for the kernel G is given by:

$$\Gamma=\{(p,q)|-K\leq p\leq K, -K\leq q\leq K\}.$$

(27) The method of any one of process (1) through process (26), wherein: the estimated depth values are normalized estimated depth values calculated using the confidence mask matrix C, and elements $\langle\hat{h}_{ij}\rangle$ of the corrected matrix $\hat{H}$ corresponding to the corrected second pixels have values given by:

$$\langle\hat{h}_{ij}\rangle = \frac{\hat{h}_{ij}}{\hat{c}_{ij}+\varepsilon},$$

where $\hat{h}_{ij}$ corresponds to unnormalized values given by:

$$\hat{h}_{ij} = \sum_{p=-K}^{K}\sum_{q=-K}^{K} H(i-p, j-q)C(i-p, j-q)G(K-p, K-q),$$

where a set Γ of indices (p, q) for the kernel G is given by:

$$\Gamma=\{(p,q)|-K\leq p\leq K, -K\leq q\leq K\},$$

where $\hat{c}_{ij}$ are elements of a weight normalization matrix $\hat{C}$ obtained by, for each of the at least some of the second pixels, convolving the kernel G with a corresponding portion of the confidence mask matrix C according to:

$$\hat{c}_{ij} = \sum_{p=-K}^{K}\sum_{q=-K}^{K} C(i-p, j-q)G(K-p, K-q),$$

and where ε is a non-zero constant.

(28) The method of any one of process (1) through process (27), wherein ε has a value in a range from 0.00001 to 0.001.

(29) The method of any one of process (1) through process (28), wherein ε has a value of 0.00001 or smaller.

A system for repairing 3D images according to the technology described herein may be embodied in different configurations, examples of which include configurations (30) through (58), as follows:

(30) A system for repairing a 3D image generated by a vision system on a vehicle, the system comprising: at least one computer processor coupled to a memory, the at least one computer processor being configured to: (a) obtain a three-dimensional (3D) image of a scene, the 3D image corresponding to a depth map of the scene generated from at least one two-dimensional (2D) image captured of the scene, wherein: the 3D image comprises a plurality of pixels arranged in a matrix H, and the pixels comprise first pixels and second pixels, each of the first pixels having a first pixel value corresponding to a depth value for a portion of the scene represented by the first pixel, and each of the second pixels corresponding to a hole having an unknown depth value for a portion of the scene represented by the second pixel; (b) determine a confidence mask matrix C for the 3D image; (c) for each of at least some of the second pixels: determine a kernel G of neighboring pixels of the second pixel, the neighboring pixels of the kernel G having values corresponding to a predetermined distribution, and convolve the kernel G with a portion of the confidence mask matrix C and a portion of the matrix H corresponding to the kernel G to obtain an estimated depth value for the second pixel; (d) generate a corrected matrix $\hat{H}$ representing a corrected 3D image, the matrix $\hat{H}$ comprising the first pixels and corrected second pixels, wherein the corrected second pixels correspond to the second pixels corrected to have second pixel values corresponding to the estimated depth values; and output depth data corresponding to at least a portion of the corrected matrix H to the vehicle, wherein a total number of holes in the matrix H is greater than a total number of holes in the corrected matrix $\hat{H}$.

(31) The system of configuration (30), wherein the depth data is output in real time or nearly real time with a time when the at least one 2D image is captured of the scene.

(32) The system of configuration (30) or configuration (31), wherein, when the kernel G of the second pixel comprises none of the first pixels, the second pixel remains a hole in the corrected matrix $\hat{H}$.

(33). The system of any one of configuration (30) through configuration (32), wherein the corrected 3D image comprises: at least some of the first pixels of the 3D image, and at least some of the corrected second pixels.

(34) The system of any one of configuration (30) through configuration (33), wherein the depth data corresponds to at least a portion of the corrected matrix $\hat{H}$ and is output to at least one electronic control unit (ECU) of the vehicle.

(35) The system of any one of configuration (30) through configuration (34), wherein the depth data corresponds to at least a portion of the corrected matrix $\hat{H}$ and is output to a computer controller of the vehicle.

(36) The system of any one of configuration (30) through configuration (35), wherein the depth data corresponds to at least a portion of the corrected matrix $\hat{H}$ and is output to a display monitor of the automobile.

(37) The system of any one of configuration (30) through configuration (36), wherein the depth data corresponds to some or all of the corrected 3D image and is output to a display of the automobile.

(38) The system of any one of configuration (30) through configuration (37), wherein the depth data corresponds to at least a portion of the corrected matrix $\hat{H}$ and is output to a transmitter of the vehicle for transmission to a computer external to the vehicle.

(39) The system of any one of configuration (30) through configuration (38), wherein the computer external to the vehicle is a computer of a second vehicle.

(40) The system of any one of configuration (30) through configuration (39), wherein the vehicle is a first moving vehicle and the second vehicle is a second moving vehicle.

(41) The system of any one of configuration (30) through configuration (40), wherein the depth data is output within 1 second of when the at least one 2D image is captured of the scene.

(42) The system of any one of configuration (30) through configuration (41), wherein the depth data is output within 0.1 see of when the at least one 2D image is captured of the scene.

(43) The system of any one of configuration (30) through configuration (42), wherein the depth data us output within 0.01 second when the at least one 2D image is captured of the scene.

(44) The system of any one of configuration (30) through configuration (43), wherein the depth data is output within 1 millisecond of when the at least one 2D image is captured of the scene.

(45) The system of any one of configuration (30) through configuration (44), wherein the 3D image of the scene is part of a real-time video stream obtained by the at least one computer processor.

(46) The system of any one of configuration (30) through configuration (45), wherein the at least one computer processor is further configured to: repeat (a) through (d) using the corrected 3D image as the 3D image of the scene.

(47) The system of any one of configuration (30) through configuration (46), wherein: the confidence mask matrix C and the matrix H have a same size, elements of the confidence mask matrix C corresponding to the first pixels have a first value, and elements of the confidence mask matrix C corresponding to the second pixels have a second value different from the first value.

(48) The system of any one of configuration (30) through configuration (47), wherein the first value is 1.

(49) The system of any one of configuration (30) through configuration (48), wherein the second value is 0.

(50) The system of any one of configuration (30) through configuration (49), wherein: each of the confidence mask matrix C, the matrix H, and the corrected matrix $\hat{H}$ comprises M rows and N columns such that a set I of indices for the confidence mask matrix C, the matrix H, and the corrected matrix $\hat{H}$ is given by:

$$I=\{(i,j)|1 \leq i \leq M, 1 \leq j \leq N\},$$

and elements $c_{ij}$ of the confidence mask matrix C have values given by:

$$c_{ij} = \begin{cases} 1, \text{if } (i,j) \text{ is for one of the first pixels} \\ 0, \text{if } (i,j) \text{ is for one of the second pixels.} \end{cases}$$

(51) The system of any one of configuration (30) through configuration (50), wherein, in (c), the kernel G of neighboring pixels has a size of 2K+1, where K is a natural number greater than 0.

(52) The system of any one of configuration (30) through configuration (51), wherein the natural number is in a range of 1 to 31.

(53) The system of any one of configuration (30) through configuration (52), wherein the natural number is in a range of 3 to 15.

(54) The system of any one of configuration (30) through configuration (53), wherein the kernel G is a square kernel.

(55) The system of any one of configuration (30) through configuration (54), wherein: the corrected second pixels of the corrected matrix $\hat{H}$ have values corresponding to the estimated depth values for the second pixels, elements $\hat{h}_{ij}$ of the corrected matrix $\hat{H}$ corresponding to the corrected second pixels have values given by:

$$\hat{h}_{ij} = \sum_{p=-K}^{K} \sum_{q=-K}^{K} H(i-p, j-q) C(i-p, j-q) G(K-p, K-q),$$

wherein a set $\Gamma$ of indices for the kernel G is given by:

$$\Gamma=\{(p,q)|-K \leq p \leq K, -K \leq q \leq K\}.$$

(56) The system of any one of configuration (30) through configuration (55), wherein: the estimated depth values are normalized estimated depth values calculated using the confidence mask matrix C, and elements $\langle \hat{h}_{ij} \rangle$ of the corrected matrix $\hat{H}$ corresponding to the corrected second pixels have values given by:

$$\langle \hat{h}_{ij} \rangle = \frac{\hat{h}_{ij}}{\hat{c}_{ij} + \varepsilon},$$

where $\hat{h}_{ij}$ corresponds to unnormalized values given by:

$$\hat{h}_{ij} = \sum_{p=-K}^{K}\sum_{q=-K}^{K} H(i-p, j-q)C(i-p, j-q)G(K-p, K-q),$$

where a set Γ of indices for the kernel G is given by:

Γ={(p,q)|−K≤p≤K,−K≤q≤K} where $\hat{c}_{ij}$ are elements of a weight normalization matrix $\hat{C}$ obtained by, for each of the at least some of the second pixels, convolving the kernel G with a corresponding portion of the confidence mask matrix C, the according to:

$$\hat{c}_{ij} = \sum_{p=-K}^{K}\sum_{q=-K}^{K} C(i-p, j-q)G(K-p, K-q),$$

and where ε is a non-zero constant.

(57) The system of any one of configuration (30) through configuration (56), wherein e has a value in a range from 0.00001 to 0.001.

(58) The system of any one of configuration (30) through configuration (57), wherein e has a value of 0.00001 or smaller.

Methods of repairing holes in 3D images according to the technology described herein may be performed computer processors executing code stored on non-transitory computer-readable storage media. Examples of the storage media include configurations (59) through (87), as follows:

(59) A non-transitory computer-readable storage medium storing computer code that when executed by at least one computer processor causes the at least one computer processor to perform a method of repairing a 3D image generated by a vision system on a vehicle, where the method comprises: (a) obtaining a three-dimensional (3D) image of a scene, the 3D image corresponding to a depth map of the scene generated from at least one two-dimensional (2D) image captured of the scene, wherein: the 3D image comprises a plurality of pixels arranged in a matrix H, and the pixels comprise first pixels and second pixels, each of the first pixels having a first pixel value corresponding to a depth value for a portion of the scene represented by the first pixel, and each of the second pixels corresponding to a hole having an unknown depth value for a portion of the scene represented by the second pixel; (b) determining a confidence mask matrix C for the 3D image; (c) for each of at least some of the second pixels: determining a kernel G of neighboring pixels of the second pixel, the neighboring pixels of the kernel G having values corresponding to a predetermined distribution, and convolving the kernel G with a portion of the confidence mask matrix C and a portion of the matrix H corresponding to the kernel G to obtain an estimated depth value for the second pixel; (d) generating a corrected matrix $\hat{H}$ representing a corrected 3D image, the corrected matrix $\hat{H}$ comprising the first pixels and corrected second pixels, wherein the corrected second pixels correspond to the second pixels corrected to have second pixel values corresponding to the estimated depth values; and outputting data corresponding to at least a portion of the corrected matrix $\hat{H}$ to the vehicle, wherein a total number of holes in the matrix H is greater than a total number of holes in the corrected matrix $\hat{H}$.

(60) The storage medium of configuration (59), wherein the outputting occurs in real time or nearly real time to a time when the at least one 2D image is captured of the scene.

(61) The storage medium of configuration (59) or configuration (60), wherein, when the kernel G of the second pixel comprises none of the first pixels, the second pixel remains a hole in the corrected matrix $\hat{H}$.

(62) The storage medium of any one of configuration (59) through configuration (61), wherein the corrected 3D image comprises: at least some of the first pixels of the 3D image, and at least some of the corrected second pixels.

(63) The storage medium of any one of configuration (59) through configuration (62), wherein the outputting outputs data corresponding to at least a portion of the corrected matrix $\hat{H}$ to at least one electronic control unit (ECU) of the vehicle.

(64) The storage medium of any one of configuration (59) through configuration (63), wherein the outputting outputs data corresponding to at least a portion of the corrected matrix $\hat{H}$ to a computer controller of the vehicle.

(65) The storage medium of any one of configuration (59) through configuration (64), wherein the outputting outputs data corresponding to at least a portion of the corrected matrix $\hat{H}$ to a display monitor of the automobile.

(66) The storage medium of any one of configuration (59) through configuration (65), wherein the outputting outputs data corresponding to some or all of the corrected 3D image to a display of the automobile.

(67) The storage medium of any one of configuration (59) through configuration (66), wherein the outputting outputs data corresponding to at least a portion of the corrected matrix $\hat{H}$ to a transmitter of the vehicle for transmission to a computer external to the vehicle.

(68) The storage medium of any one of configuration (59) through configuration (67), wherein the computer external to the vehicle is a computer of a second vehicle.

(69) The storage medium of any one of configuration (59) through configuration (68), wherein the vehicle is a first moving vehicle and the second vehicle is a second moving vehicle.

(70) The storage medium of any one of configuration (59) through configuration (69), wherein the outputting occurs within 1 second of when the at least one 2D image is captured of the scene.

(71) The storage medium of any one of configuration (59) through configuration (70), wherein the outputting occurs within 0.1 sec of when the at least one 2D image is captured of the scene.

(72) The storage medium of any one of configuration (59) through configuration (71), wherein the outputting occurs within 0.01 second when the at least one 2D image is captured of the scene.

(73) The storage medium of any one of configuration (59) through configuration (72), wherein the outputting occurs within 1 millisecond of when the at least one 2D image is captured of the scene.

(74) The storage medium of any one of configuration (59) through configuration (73), wherein the 3D image of the scene is part of a real-time video stream obtained from a vision system on the vehicle.

(75) The storage medium of any one of configuration (59) through configuration (74), further comprising: repeating (a) through (d) using the corrected 3D image as the 3D image of the scene.

(76) The storage medium of any one of configuration (59) through configuration (75), wherein: the confidence mask matrix C and the matrix H have a same size, elements of the confidence mask matrix C corresponding to the first pixels have a first value, and elements of the confidence mask matrix C corresponding to the second pixels have a second value different from the first value.

(77) The storage medium of any one of configuration (59) through configuration (76), wherein the first value is 1.

(78) The storage medium of any one of configuration (59) through configuration (77), wherein the second value is 0.

(79) The storage medium of any one of configuration (59) through configuration (78), wherein: each of the confidence mask matrix C, the matrix H, and the corrected matrix Ĥ comprises M rows and N columns such that a set I of indices for the confidence mask matrix C, the matrix H, and the corrected matrix Ĥ is given by:

$$I=\{(i,j)|1\leq i\leq M, 1\leq j\leq N\},$$

and elements $c_{ij}$ of the confidence mask matrix C have values given by:

$$c_{ij} = \begin{cases} 1, & \text{if } (i, j) \text{ is for one of the first pixels} \\ 0, & \text{if } (i, j) \text{ is for one of the second pixels.} \end{cases}$$

(80) The storage medium of any one of configuration (59) through configuration (79), wherein, in (c), the determining of the kernel G of neighboring pixels determines the kernel G to have a size of 2K+1, where K is a natural number greater than 0.

(81) The storage medium of any one of configuration (59) through configuration (80), wherein the natural number is in a range of 1 to 30.

(82) The storage medium of any one of configuration (59) through configuration (81), wherein the natural number is in a range of 3 to 15.

(83) The storage medium of any one of configuration (59) through configuration (82), wherein the kernel G is a square kernel.

(84) The storage medium of any one of configuration (59) through configuration (83), wherein: the corrected second pixels of the corrected matrix Ĥ have values corresponding to the estimated depth values for the second pixels, and elements $\hat{h}_{ij}$ of the corrected matrix Ĥ corresponding to the corrected second pixels have values given by:

$$\hat{h}_{ij} = \sum_{p=-K}^{K}\sum_{q=-K}^{K} H(i-p, j-q)C(i-p, j-q)G(K-p, K-q),$$

where a set Γ of indices (p, q) for the kernel G is given by:

$$\Gamma=\{(p,q)|-K\leq p\leq K, -K\leq q\leq K\}.$$

(85) The storage medium of any one of configuration (59) through configuration (84), wherein: the estimated depth values are normalized estimated depth values calculated using the confidence mask matrix C, and elements $\langle\hat{h}_{ij}\rangle$ of the corrected matrix Ĥ corresponding to the corrected second pixels have values given by:

$$\langle\hat{h}_{ij}\rangle = \frac{\hat{h}_{ij}}{\hat{c}_{ij}+\varepsilon},$$

where $\hat{h}_{ij}$ corresponds to unnormalized values given by:

$$\hat{h}_{ij} = \sum_{p=-K}^{K}\sum_{q=-K}^{K} H(i-p, j-q)C(i-p, j-q)G(K-p, K-q),$$

where a set Γ of indices (p, q) for the kernel G is given by:

$$\Gamma=\{(p,q)|-K\leq p\leq K, -K\leq q\leq K\}$$

where $\hat{c}_{ij}$ are elements of a weight normalization matrix Ĉ obtained by, for each of the at least some of the second pixels, convolving the kernel G with a corresponding portion of the confidence mask matrix C according to:

$$\hat{c}_{ij} = \sum_{p=-K}^{K}\sum_{q=-K}^{K} C(i-p, j-q)G(K-p, K-q),$$

and where ε is a non-zero constant.

(86) The storage medium of any one of configuration (59) through configuration (85), wherein e has a value in a range from 0.00001 to 0.001.

(87) The storage medium of any one of configuration (59) through configuration (86), wherein e has a value of 0.00001 or smaller.

REFERENCES

[1] N. Owano, "Mercedes-Benz S-Class stability system uses sensors, stereo camera (w/Video)," 2013 phys.org. [Online]. Available: https://phys.org/news/2013-09-mercedes-benz-s-class-stability-sensors-stereo.html.

[2] "Tesla Vision Update: Replacing Ultrasonic Sensors with Tesla Vision," 2023 Tesla. [Online]. Available: https://www.tesla.com/support/transitioning-tesla-vision.

[3] "EyeSight Driver Assist Technology," 2022 Subaru. [Online]. Available: https://www.subaru.com/eyesight.html.

[4] "Open Source Computer Vision Library," 2021 GitHub. [Online]. Available: https://github.com/opencv/opencv/tree/3.4.16.

[5] C. Tomasi and R. Manduchi, "Bilateral Filtering for Gray and Color Images," Sixth International Conference on Computer Vision (IEEE Cat. No. 98CH36271), 1998 IEEE, pp. 839-846, doi: 10.1109/ICCV.1998.710815.

[6] S. Liu, Y. Wang, J. Wang, H. Wang, J. Zhang, and C. Pan, "Kinect depth restoration via energy minimization with $TV_{21}$ regularization," 2013 IEEE International Conference on Image Processing, 2013 IEEE, pp. 724-724, doi: 10.1109/ICIP.2013.6738149.

[7] S.-W. Nam, K.-H. Jang, Y.-J. Ban, H.-S. Kim, and S.-I. Chien, "Hole-Filling Methods Using Depth and Color Information for Generating Multiview Images," ETRI Journal, vol. 38, no. 5, pp. 996-1007, 2016.

CONCLUSION

It should be understood that various alterations, modifications, and improvements may be made to the structures, configurations, and methods discussed above, and are intended to be within the spirit and scope of the invention disclosed herein. Further, although advantages of the present invention are indicated, it should be appreciated that not every embodiment of the invention will include every described advantage. Some embodiments may not implement any features described as advantageous herein. Accordingly, the foregoing description and attached drawings are by way of example only.

It should be understood that some aspects of the present technology may be embodied as one or more methods, and acts performed as part of a method of the present technology may be ordered in any suitable way. Accordingly, embodiments may be constructed in which acts are performed in an order different than shown and/or described, which may include performing some acts simultaneously, even though shown and/or described as sequential acts in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the description and the claims to modify an element does not by itself connote any priority, precedence, or order of one element over another, or the temporal order in which acts of a method are performed, but are used merely as labels to distinguish one element or act having a certain name from another element or act having a same name (but for use of the ordinal term) to distinguish the elements or acts.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

As used herein in the specification and in the claims, the phrase "equal" or "the same" in reference to two values (e.g., distances, widths, etc.) means that two values are the same within manufacturing tolerances. Thus, two values being equal, or the same, may mean that the two values are different from one another by ±5%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B" when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

Also, the phraseology and terminology used herein is for the purpose of description and should not be regarded as limiting. Use of terms such as "including," "comprising," "comprised of," "having," "containing," and "involving," and variations thereof herein, is meant to encompass the items listed thereafter and equivalents thereof as well as additional items.

The terms "approximately" and "about" if used herein may be construed to mean within ±20% of a target value in some embodiments, within ±10% of a target value in some embodiments, within ±5% of a target value in some embodiments, and within ±2% of a target value in some embodiments. The terms "approximately" and "about" may equal the target value.

The term "substantially" if used herein may be construed to mean within 95% of a target value in some embodiments, within 98% of a target value in some embodiments, within 99% of a target value in some embodiments, and within 99.5% of a target value in some embodiments. In some embodiments, the term "substantially" may equal 100% of the target value.

What is claimed is:

1. A method of repairing a 3D image generated by a vision system on a vehicle, the method comprising:
  (a) obtaining a three-dimensional (3D) image of a scene, the 3D image corresponding to a depth map of the scene generated from at least one two-dimensional (2D) image captured of the scene, wherein:
    the 3D image comprises a plurality of pixels arranged in a matrix H, and
    the pixels comprise first pixels and second pixels, each of the first pixels having a first pixel value corresponding to a depth value for a portion of the scene represented by the first pixel, and each of the second pixels corresponding to a hole having an unknown depth value for a portion of the scene represented by the second pixel;
  (b) determining a non-binary confidence mask matrix C for the 3D image having a distribution of confidence values;
  (c) for each of at least some of the second pixels:
    determining a kernel G of neighboring pixels of the second pixel, the neighboring pixels of the kernel G having values corresponding to a predetermined distribution, and
    convolving the kernel G with a portion of the confidence mask matrix C and a portion of the matrix H corresponding to the kernel G to obtain an estimated depth value for the second pixel;
  (d) generating a corrected matrix $\hat{H}$ representing a corrected 3D image, the corrected matrix $\hat{H}$ comprising the first pixels and corrected second pixels, wherein the corrected second pixels correspond to the second pixels corrected to have second pixel values corresponding to the estimated depth values, wherein elements of the corrected matrix $\hat{H}$ are normalized based on a normalization matrix $\hat{C}$ obtained from the confidence mask matrix C; and outputting data corresponding to at least a portion of the corrected matrix $\hat{H}$ to the vehicle, wherein a total number of holes in the matrix H is greater than a total number of holes in the corrected matrix $\hat{H}$.

2. The method of claim 1, wherein the outputting occurs within 0.5 second of a time when the at least one 2D image is captured of the scene.

3. The method of claim 1, further comprising:
repeating (a) through (d) using the corrected 3D image as the 3D image of the scene.

4. The method of claim 1, wherein:
the confidence mask matrix C and the matrix H have a same size,
elements of the confidence mask matrix C corresponding to the first pixels have a first value, and
elements of the confidence mask matrix C corresponding to the second pixels have a second value different from the first value.

5. The method of claim 4, wherein:
each of the confidence mask matrix C, the matrix H, and the corrected matrix $\hat{H}$ comprises M rows and N columns such that a set I of indices for the confidence mask matrix C, the matrix H, and the corrected matrix $\hat{H}$ is given by:

$$I=\{(i,j)|1\leq i\leq M, 1\leq j\leq N\}.$$

6. The method of claim 5, wherein, in (c), the determining of the kernel G of neighboring pixels determines the kernel G to have a size of 2K+1, where K is a natural number greater than 0.

7. The method of claim 6, wherein:
the estimated depth values are normalized estimated depth values calculated using the confidence mask matrix C, and
elements $\langle\hat{h}_{ij}\rangle$ of the corrected matrix $\hat{H}$ corresponding to the corrected second pixels have values given by:

$$\langle\hat{h}_{ij}\rangle = \frac{\hat{h}_{ij}}{\hat{c}_{ij}+\varepsilon},$$

where $\hat{h}_{ij}$ corresponds to unnormalized values given by:

$$\hat{h}_{ij} = \sum_{p=-K}^{K}\sum_{q=-K}^{K} H(i-p, j-q)C(i-p, j-q)G(K-p, K-q),$$

where a set $\Gamma$ of indices (p, q) for the kernel G is given by:

$$\Gamma=\{(p,q)|-K\leq p\leq K, -K\leq q\leq K\},$$

where $\hat{c}_{ij}$ are elements of the normalization matrix $\hat{C}$ obtained by, for each of the at least some of the second pixels, convolving the kernel G with a corresponding portion of the confidence mask matrix C according to:

$$\hat{c}_{ij} = \sum_{p=-K}^{K}\sum_{q=-K}^{K} C(i-p, j-q)G(K-p, K-q),$$

and
where $\varepsilon$ is a non-zero constant.

8. A system for repairing a 3D image generated by a vision system on a vehicle, the system comprising:
at least one computer processor coupled to a memory, the at least one computer processor being configured to:
(a) obtain a three-dimensional (3D) image of a scene, the 3D image corresponding to a depth map of the scene generated from at least one two-dimensional (2D) image captured of the scene, wherein:
the 3D image comprises a plurality of pixels arranged in a matrix H, and
the pixels comprise first pixels and second pixels, each of the first pixels having a first pixel value corresponding to a depth value for a portion of the scene represented by the first pixel, and each of the second pixels corresponding to a hole having an unknown depth value for a portion of the scene represented by the second pixel;
(b) determine a non-binary confidence mask matrix C for the 3D image having a distribution of confidence values;
(c) for each of at least some of the second pixels:
determine a kernel G of neighboring pixels of the second pixel, the neighboring pixels of the kernel G having values corresponding to a predetermined distribution, and
convolve the kernel G with a portion of the confidence mask matrix C and a portion of the matrix H corresponding to the kernel G to obtain an estimated depth value for the second pixel;
(d) generate a corrected matrix $\hat{H}$ representing a corrected 3D image, the matrix $\hat{H}$ comprising the first pixels and corrected second pixels, wherein the corrected second pixels correspond to the second pixels corrected to have second pixel values corresponding to the estimated depth values, wherein elements of the corrected matrix $\hat{H}$ are normalized based on a normalization matrix $\hat{C}$ obtained from the confidence mask matrix C; and
output depth data corresponding to at least a portion of the corrected matrix $\hat{H}$ to the vehicle,
wherein a total number of holes in the matrix H is greater than a total number of holes in the corrected matrix $\hat{H}$.

9. The system of claim 8, wherein the depth data is output within 0.5 second of a time when the at least one 2D image is captured of the scene.

10. The system of claim 8, wherein the at least one computer processor is further configured to:
repeat (a) through (d) using the corrected 3D image as the 3D image of the scene.

11. The system of claim 8, wherein:
the confidence mask matrix C and the matrix H have a same size,
elements of the confidence mask matrix C corresponding to the first pixels have a first value, and
elements of the confidence mask matrix C corresponding to the second pixels have a second value different from the first value.

12. The system of claim 11, wherein:
each of the confidence mask matrix C, the matrix H, and the corrected matrix $\hat{H}$ comprises M rows and N columns such that a set I of indices for the confidence mask matrix C, the matrix H, and the corrected matrix $\hat{H}$ is given by:

$$I=\{(i,j)|1\leq i\leq M, 1\leq j\leq N\}.$$

13. The system of claim 12, wherein, in (c), the kernel G of neighboring pixels has a size of 2K+1, where K is a natural number greater than 0.

14. The system of claim 13, wherein:
the estimated depth values are normalized estimated depth values calculated using the confidence mask matrix C, and
elements $\langle \hat{h}_{ij} \rangle$ of the corrected matrix $\hat{H}$ corresponding to the corrected second pixels have values given by:

$$\langle \hat{h}_{ij} \rangle = \frac{\hat{h}_{ij}}{\hat{c}_{ij} + \varepsilon},$$

where $\hat{h}_{ij}$ corresponds to unnormalized values given by:

$$\hat{h}_{ij} = \sum_{p=-K}^{K} \sum_{q=-K}^{K} H(i-p, j-q)C(i-p, j-q)G(K-p, K-q),$$

where a set $\Gamma$ of indices for the kernel G is given by:

$\Gamma = \{(p,q) | -K \leq p \leq K, -K \leq q \leq K\},$ where $\hat{c}_{ij}$ are elements of the normalization matrix $\hat{C}$ obtained by, for each of the at least some of the second pixels, convolving the kernel G with a corresponding portion of the confidence mask matrix C, the according to:

$$\hat{c}_{ij} = \sum_{p=-K}^{K} \sum_{q=-K}^{K} C(i-p, j-q)G(K-p, K-q),$$

and
where $\varepsilon$ is a non-zero constant.

15. A non-transitory computer-readable storage medium storing computer code that when executed by at least one computer processor causes the at least one computer processor to perform a method of repairing a 3D image generated by a vision system on a vehicle, where the method comprises:
(a) obtaining a three-dimensional (3D) image of a scene, the 3D image corresponding to a depth map of the scene generated from at least one two-dimensional (2D) image captured of the scene, wherein:
the 3D image comprises a plurality of pixels arranged in a matrix H, and
the pixels comprise first pixels and second pixels, each of the first pixels having a first pixel value corresponding to a depth value for a portion of the scene represented by the first pixel, and each of the second pixels corresponding to a hole having an unknown depth value for a portion of the scene represented by the second pixel;
(b) determining a non-binary confidence mask matrix C for the 3D image having a distribution of confidence values;
(c) for each of at least some of the second pixels:
determining a kernel G of neighboring pixels of the second pixel, the neighboring pixels of the kernel G having values corresponding to a predetermined distribution, and
convolving the kernel G with a portion of the confidence mask matrix C and a portion of the matrix H corresponding to the kernel G to obtain an estimated depth value for the second pixel;

(d) generating a corrected matrix $\hat{H}$ representing a corrected 3D image, the corrected matrix $\hat{H}$ comprising the first pixels and corrected second pixels, wherein the corrected second pixels correspond to the second pixels corrected to have second pixel values corresponding to the estimated depth values, wherein elements of the corrected matrix $\hat{H}$ are normalized based on a normalization matrix $\hat{C}$ obtained from the confidence mask matrix C; and
outputting data corresponding to at least a portion of the corrected matrix $\hat{H}$ to the vehicle,
wherein a total number of holes in the matrix H is greater than a total number of holes in the corrected matrix $\hat{H}$.

16. The storage medium of claim 15, wherein the outputting occurs within 0.5 second of a time when the at least one 2D image is captured of the scene.

17. The storage medium of claim 15, further comprising:
repeating (a) through (d) using the corrected 3D image as the 3D image of the scene.

18. The storage medium of claim 15, wherein:
the confidence mask matrix C and the matrix H have a same size,
elements of the confidence mask matrix C corresponding to the first pixels have a first value, and
elements of the confidence mask matrix C corresponding to the second pixels have a second value different from the first value.

19. The storage medium of claim 18, wherein:
each of the confidence mask matrix C, the matrix H, and the corrected matrix $\hat{H}$ comprises M rows and N columns such that a set I of indices for the confidence mask matrix C, the matrix H, and the corrected matrix $\hat{H}$ is given by:

$I = (i,j) | 1 \leq i \leq M, 1 \leq j \leq N.$

20. The storage medium of claim 19, wherein, in (c), the determining of the kernel G of neighboring pixels determines the kernel G to have a size of 2K+1, where K is a natural number greater than 0.

21. The storage medium of claim 20, wherein:
the estimated depth values are normalized estimated depth values calculated using the confidence mask matrix C, and
elements $\langle \hat{h}_{ij} \rangle$ of the corrected matrix $\hat{H}$ corresponding to the corrected second pixels have values given by:

$$\langle \hat{h}_{ij} \rangle = \frac{\hat{h}_{ij}}{\hat{c}_{ij} + \varepsilon},$$

where $\hat{h}_{ij}$ corresponds to unnormalized values given by:

$$\hat{h}_{ij} = \sum_{p=-K}^{K} \sum_{q=-K}^{K} H(i-p, j-q)C(i-p, j-q)G(K-p, K-q),$$

where a set $\Gamma$ of indices (p, q) for the kernel G is given by:

$\Gamma = \{(p,q) | -K \leq p \leq K, -K \leq q \leq K\},$ where $\hat{c}_{ij}$ are elements of the normalization matrix $\hat{C}$ obtained by, for each of the at least some of the second pixels, convolving the kernel G with a corresponding portion of the confidence mask matrix C according to:

$$\hat{c}_{ij} = \sum_{p=-K}^{K}\sum_{q=-K}^{K} C(i-p, j-q)G(K-p, K-q),$$

where ε is a non-zero constant.

* * * * *